US011947296B2

(12) United States Patent
Shimada et al.

(10) Patent No.: US 11,947,296 B2
(45) Date of Patent: Apr. 2, 2024

(54) NIP FORMING DEVICE AND IMAGE FORMING APPARATUS

(71) Applicants: Hiroyuki Shimada, Tokyo (JP); Tomoya Adachi, Kanagawa (JP); Yukimichi Someya, Saitama (JP); Yuusuke Furuichi, Kanagawa (JP)

(72) Inventors: Hiroyuki Shimada, Tokyo (JP); Tomoya Adachi, Kanagawa (JP); Yukimichi Someya, Saitama (JP); Yuusuke Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/151,091

(22) Filed: Jan. 6, 2023

(65) Prior Publication Data

US 2023/0288855 A1 Sep. 14, 2023

(30) Foreign Application Priority Data

Mar. 4, 2022 (JP) ................................. 2022-033497

(51) Int. Cl.
*G03G 15/20* (2006.01)
*G03G 15/00* (2006.01)

(52) U.S. Cl.
CPC ..... *G03G 15/2064* (2013.01); *G03G 15/2053* (2013.01); *G03G 15/5004* (2013.01); *G03G 2215/2025* (2013.01)

(58) Field of Classification Search
CPC ........... G03G 15/2064; G03G 15/2053; G03G 15/5004; G03G 2215/2025; G03G 15/2039; G03G 15/205
See application file for complete search history.

(56) References Cited

U.S. PATENT DOCUMENTS

| | | | | |
|---|---|---|---|---|
| 2008/0279575 A1 | 11/2008 | Ozaki | | |
| 2013/0209115 A1* | 8/2013 | Hase | G03G 15/2039 | 399/33 |
| 2014/0079424 A1* | 3/2014 | Ikebuchi | G03G 15/2053 | 399/69 |

(Continued)

FOREIGN PATENT DOCUMENTS

| | | |
|---|---|---|
| JP | 2008-281595 | 11/2008 |
| JP | 2009-288587 | 12/2009 |
| JP | 2019-179087 | 10/2019 |

*Primary Examiner* — Sandra Brase

(74) *Attorney, Agent, or Firm* — Harness, Dickey & Pierce, P.L.C.

(57) ABSTRACT

A nip forming device includes an endless film and a pressure rotator that presses against a heater via the endless film. A driver drives and rotates the pressure rotator to cause the pressure rotator to drive and rotate the endless film. A controller controls the driver to drive and rotate the pressure rotator, based on a temperature of the pressure rotator, that is detected by a detector, in a forward direction to convey a conveyed object and to interrupt forward rotation of the pressure rotator. In response to a determination that the temperature of the pressure rotator is higher than a predetermined temperature when a job of the nip forming device is finished, the controller controls the driver to drive and rotate the pressure rotator for a predetermined time in a backward direction opposite to the forward direction and to interrupt backward rotation of the pressure rotator.

20 Claims, 16 Drawing Sheets

(56) References Cited

U.S. PATENT DOCUMENTS

| | | | |
|---|---|---|---|
| 2021/0041811 A1 | 2/2021 | Shimada | |
| 2022/0299919 A1 | 9/2022 | Inoue et al. | |
| 2022/0299920 A1 | 9/2022 | Shimada et al. | |
| 2022/0308511 A1 | 9/2022 | Someya et al. | |
| 2022/0382192 A1 | 12/2022 | Inoue et al. | |

* cited by examiner

NIP FORMING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-033497, filed on Mar. 4, 2022, in the Japan Patent Office, the entire disclosure of which is hereby incorporated by reference herein.

BACKGROUND

Technical Field

Embodiments of this disclosure relate to a nip forming device and an image forming apparatus, and more specifically, to a nip forming device and an image forming apparatus incorporating the nip forming device.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses include a fixing device that fixes an image on a recording medium such as a sheet. The fixing device includes a fixing roller and a pressure roller.

SUMMARY

This specification describes below an improved nip forming device. In one embodiment, the nip forming device includes an endless film that is flexible and rotates. A heater heats the endless film. A pressure rotator presses against the heater via the endless film to form a nip between the endless film and the pressure rotator, through which a conveyed object is conveyed. A driver drives and rotates the pressure rotator to cause the pressure rotator to drive and rotate the endless film. A detector detects a temperature of the pressure rotator. A controller controls the driver to drive and rotate the pressure rotator based on the temperature of the pressure rotator. The controller controls the driver to drive and rotate the pressure rotator in a forward direction to convey the conveyed object in a conveyance direction and to interrupt forward rotation of the pressure rotator. In response to a determination that the temperature of the pressure rotator is higher than a predetermined temperature when a job of the nip forming device is finished, the controller controls the driver to drive and rotate the pressure rotator for a predetermined time in a backward direction opposite to the forward direction and to interrupt backward rotation of the pressure rotator.

This specification further describes an improved nip forming device. In one embodiment, the nip forming device includes an endless film that is flexible and rotates. A heater heats the endless film. A nip former is disposed opposite an inner circumferential face of the endless film. A pressure rotator presses against the nip former via the endless film to form a nip between the endless film and the pressure rotator, through which a conveyed object is conveyed. A driver drives and rotates the pressure rotator to cause the pressure rotator to drive and rotate the endless film. A detector detects a temperature of the pressure rotator. A controller controls the driver to drive and rotate the pressure rotator based on the temperature of the pressure rotator. The controller controls the driver to drive and rotate the pressure rotator in a forward direction to convey the conveyed object in a conveyance direction and to interrupt forward rotation of the pressure rotator. In response to a determination that the temperature of the pressure rotator is higher than a predetermined temperature when a job of the nip forming device is finished, the controller controls the driver to drive and rotate the pressure rotator for a predetermined time in a backward direction opposite to the forward direction and to interrupt backward rotation of the pressure rotator.

This specification further describes an improved image forming apparatus. In one embodiment, the image forming apparatus includes an image forming device that forms an image and a nip forming device that fixes the image on a conveyed object. The nip forming device includes an endless film that is flexible and rotates. A heater heats the endless film. A pressure rotator presses against the heater via the endless film to form a nip between the endless film and the pressure rotator, through which the conveyed object is conveyed. A detector detects a temperature of the pressure rotator. A driver drives and rotates the pressure rotator to cause the pressure rotator to drive and rotate the endless film. A controller controls the driver to drive and rotate the pressure rotator based on the temperature of the pressure rotator. The controller controls the driver to drive and rotate the pressure rotator in a forward direction to convey the conveyed object in a conveyance direction and to interrupt forward rotation of the pressure rotator. In response to a determination that the temperature of the pressure rotator is higher than a predetermined temperature when a job of the nip forming device is finished, the controller controls the driver to drive and rotate the pressure rotator for a predetermined time in a backward direction opposite to the forward direction and to interrupt backward rotation of the pressure rotator.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
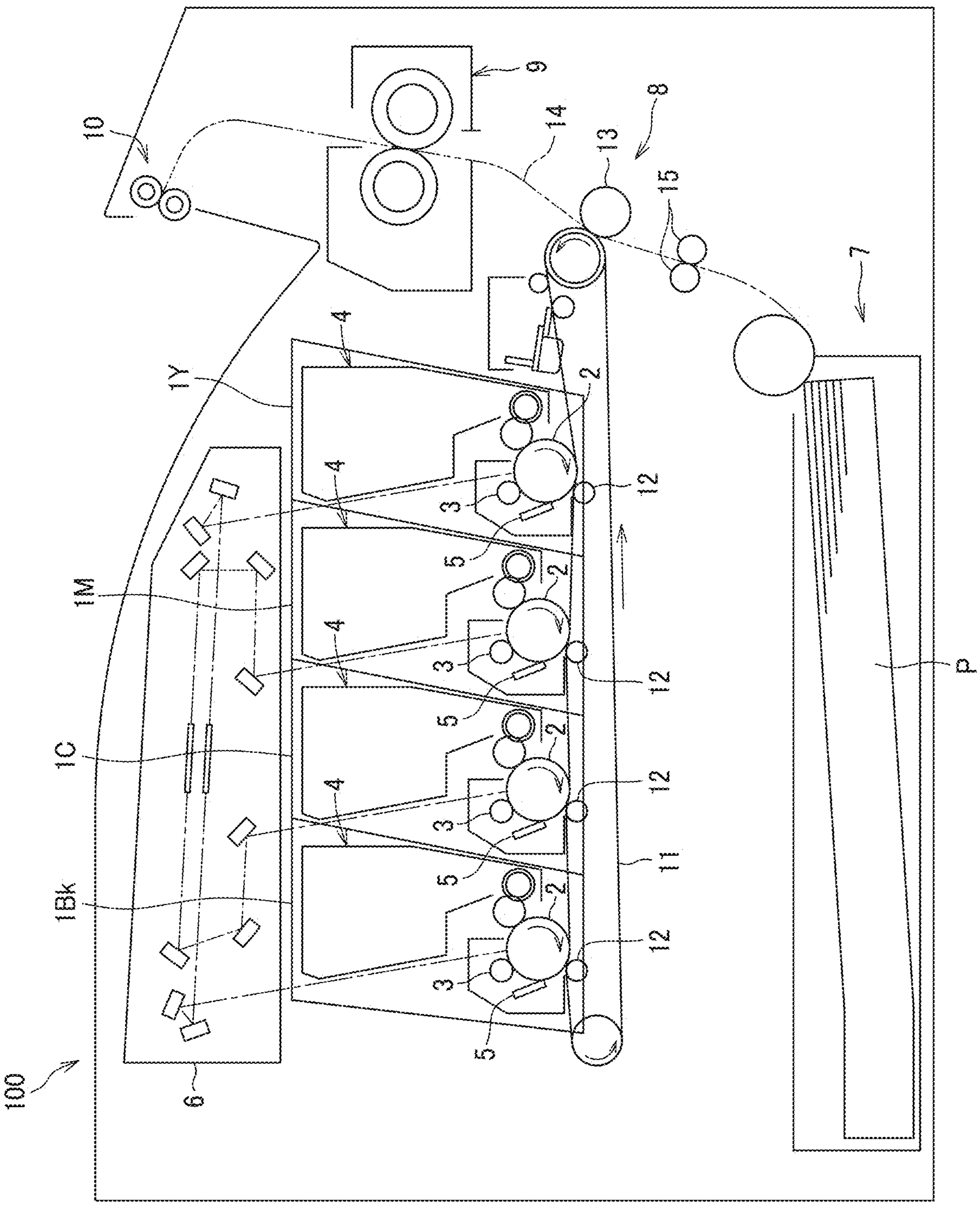
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes embodiments of the present disclosure. In the drawings for explaining the embodiments of the present disclosure, identical reference numerals are assigned to elements such as members and parts that have an identical function or an identical shape as long as differentiation is possible and a description of those elements is omitted once the description is provided.

A description is provided of a construction of an image forming apparatus 100.

FIG. 1 is a schematic cross-sectional view of the image forming apparatus 100 (e.g., a machine) according to an embodiment of the present disclosure. As illustrated in FIG. 1, the image forming apparatus 100 includes four image forming units 1Y, 1M, 1C, and 1Bk, serving as image forming devices, that are installed in a body of the image forming apparatus 100 such that the mage forming units 1Y, 1M, 1C, and 1Bk are attached to and removed from the body of the image forming apparatus 100.

The image forming units 1Y, 1M, 1C, and 1Bk have a similar construction. However, the image forming units 1Y, 1M, 1C, and 1Bk contain developers in different colors, that is, yellow, magenta, cyan, and black, respectively, which correspond to color separation components for a color image. For example, each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as the developer to the surface of the photoconductor 2 to form a toner image. The cleaner 5 cleans the surface of the photoconductor 2.

The image forming apparatus 100 further includes an exposure device 6, a sheet feeder 7, a transfer device 8, a fixing device 9, and an output device 10. The exposure device 6 exposes the surface of each of the photoconductors 2 and forms an electrostatic latent image thereon. The sheet feeder 7 supplies a sheet P serving as a conveyed object or a recording medium to the transfer device 8. The transfer device 8 transfers the toner image formed on each of the photoconductors 2 onto the sheet P. The fixing device 9 serves as a nip forming unit or a nip forming device that fixes the toner image transferred onto the sheet P thereon. The output device 10 ejects the sheet P onto an outside of the image forming apparatus 100. The recording media include, in addition to plain paper as a sheet P, thick paper, a postcard, an envelope, thin paper, coated paper, art paper, tracing paper, an overhead projector (OHP) transparency, plastic film, prepreg, and copper foil.

The transfer device 8 includes an intermediate transfer belt 11, four primary transfer rollers 12, and a secondary transfer roller 13. The intermediate transfer belt 11 is an endless belt serving as an intermediate transferor stretched taut across a plurality of rollers. The four primary transfer rollers 12 serve as primary transferors that transfer yellow, magenta, cyan, and black toner images formed on the photoconductors 2 onto the intermediate transfer belt 11, respectively, thus forming a full color toner image on the intermediate transfer belt 11. The secondary transfer roller 13 serves as a secondary transferor that transfers the full color toner image formed on the intermediate transfer belt 11 onto the sheet P. The plurality of primary transfer rollers 12 is pressed against the photoconductors 2, respectively, via the intermediate transfer belt 11.

Accordingly, the intermediate transfer belt 11 contacts each of the photoconductors 2, forming a primary transfer nip therebetween. On the other hand, the secondary transfer roller 13 is pressed against one of the plurality of rollers across which the intermediate transfer belt 11 is stretched taut via the intermediate transfer belt 11. Thus, a secondary transfer nip is formed between the secondary transfer roller 13 and the intermediate transfer belt 11.

The image forming apparatus 100 accommodates a sheet conveyance path 14 through which the sheet P fed from the sheet feeder 7 is conveyed. The sheet conveyance path 14 is provided with a timing roller pair 15 at a position between the sheet feeder 7 and the secondary transfer nip defined by the secondary transfer roller 13.

Referring to FIG. 1, a description is provided of printing processes performed by the image forming apparatus 100 having the construction described above.

When the image forming apparatus 100 receives an instruction to start printing (e.g., a print job), a driver disposed inside the body of the image forming apparatus 100 drives and rotates the photoconductor 2 clockwise in FIG. 1 in each of the image forming units 1Y, 1M, 1C, and 1Bk. The charger 3 charges the surface of the photoconductor 2 uniformly at a high electric potential. Subsequently, the exposure device 6 exposes the surface of each of the photoconductors 2 according to image data (e.g., print data) instructed by a terminal, thus decreasing the electric potential of an exposed portion on the photoconductor 2 and forming an electrostatic latent image on the photoconductor 2. Alternatively, if the image forming apparatus 100 is a copier, the exposure device 6 exposes the surface of each of the photoconductors 2 according to image data created by a scanner that reads an image on an original. The developing device 4 of each of the image forming units 1Y, 1M, 1C, and 1Bk supplies toner to the electrostatic latent image formed on the photoconductor 2, forming a toner image thereon.

When the toner images formed on the photoconductors 2 reach the primary transfer nips defined by the primary transfer rollers 12 in accordance with rotation of the photoconductors 2, the primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11, thus forming a full color toner image thereon. Thereafter, as the full color toner image formed on the intermediate transfer belt 11 is conveyed to the secondary transfer nip defined by the secondary transfer roller 13 in accordance with rotation of the intermediate transfer belt 11, the secondary transfer roller 13 transfers the full color toner image onto a sheet P conveyed to the secondary transfer nip.

The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. The secondary transfer roller 13 transfers the full color toner image onto the sheet P. Thus, the sheet P bears the full color toner image. After the toner image is transferred onto the intermediate transfer belt 11, the cleaner 5 removes residual toner remaining on the photoconductor 2 therefrom.

The sheet P transferred with the full color toner image is conveyed to the fixing device 9 that fixes the full color toner image on the sheet P. Thereafter, the output device 10 ejects the sheet P onto the outside of the image forming apparatus 100, thus finishing a series of printing processes.

A description is provided of a construction of the fixing device 9, serving as the nip forming unit or the nip forming device, according to an embodiment of the present disclosure.

Figure 2:
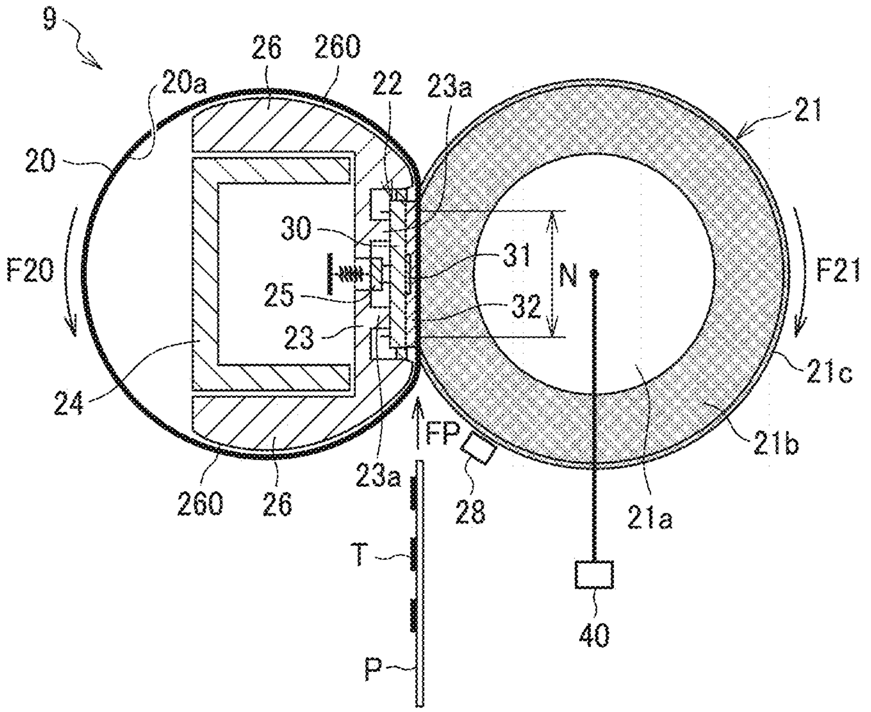
FIG. 2 is a schematic cross-sectional view of a fixing device according to an embodiment of the present disclosure that is incorporated in the image forming apparatus depicted in FIG. 1.

As illustrated in FIG. 2, the fixing device 9 according to the embodiment includes a fixing film 20, a pressure roller 21, a heater 22, a heater holder 23, a stay 24, and thermistors 25. The fixing film 20 serves as an endless film or an endless belt. The pressure roller 21 serves as a pressure rotator or a pressure member that contacts an outer circumferential face of the fixing film 20 to form a fixing nip N between the fixing film 20 and the pressure roller 21. The heater 22 (e.g., a laminated heater) serves as a heat source that heats the fixing film 20. The heater holder 23 serves as a holder that holds the heater 22. The stay 24 serves as a support that supports the heater holder 23. The thermistor 25 serves as a temperature detector or a detector that detects a temperature of the heater 22. The heater 22 also serves as a nip former or a nip formation pad that forms the fixing nip N.

The fixing device 9 further includes a separator 310 described below with reference to FIGS. 7A, 7B, and 7D. FIG. 2 omits illustration of the separator 310. The separator 310 is disposed downstream from the fixing nip N in a sheet conveyance direction FP depicted in FIG. 2 in which the sheet P is conveyed, like the separator 310 depicted in FIGS. 7A, 7B, and 7D.

As illustrated in FIG. 2, the fixing film 20 rotates in a forward direction F20. The fixing film 20 includes a tubular base layer that is made of polyimide I) and has an outer diameter of 25 mm and a thickness in a range of from 40 μm to 120 μm, for example. The fixing film 20 further includes a release layer serving as an outermost surface layer. The release layer is made of fluororesin, such as perfluoroalkoxy alkane (PFA) and polytetrafluoroethylene (PTFE), and has a thickness in a range of from 5 μm to 50 μm to enhance durability of the fixing film 20 and facilitate separation of the sheet P, toner, and a foreign substance from the fixing film 20.

The fixing film 20 may further include an elastic layer that is interposed between the base layer and the release layer. The elastic layer is made of rubber or the like and has a thickness in a range of from 50 μm to 500 μm. The base layer of the fixing film 20 may be made of heat-resistant resin such as polyetheretherketone (PEEK) or metal such as nickel (Ni) and stainless used steel (SUS), instead of polyimide. The fixing film 20 includes an inner circumferential face 20*a*. The inner circumferential face 20*a* may be coated with polyimide, PTFE, or the like to produce a sliding layer.

Alternatively, the fixing film 20 may include a base layer, a surface layer, and an adhesion layer and may not include an elastic layer. If the fixing film 20 does not incorporate the elastic layer, an entirety of the fixing film 20 may suffer from degradation in rigidity. Accordingly, when the fixing film 20 halts, the fixing film 20 is subject to deformation as described below. However, the fixing device 9 according to the embodiment includes the separator 310 that pivots in accordance with motion of the outer circumferential face of the fixing film 20 as described below. Hence, the separator 310 separates the sheet P stably.

The pressure roller 21 rotates in a forward direction F21. The pressure roller 21 has an outer diameter of 25 mm, for example. The pressure roller 21 includes a core metal 21*a*, an elastic layer 21*b*, and a release layer 21*c*. The core metal 21*a* is solid and made of iron. The elastic layer 21*b* is disposed on a surface of the core metal 21*a*. The release layer 21*c* coats an outer surface of the elastic layer 21*b*. The elastic layer 21*b* is made of silicone rubber and has a thickness of 3.5 mm, for example. In order to facilitate separation of the sheet P, the toner, and the foreign substance from the pressure roller 21, the release layer 21*c* that is made of fluororesin and has a thickness of approximately 40 μm, for example, is preferably disposed on the outer surface of the elastic layer 21*b*.

The fixing film 20 has a film diameter that is greater than a diameter of the pressure roller 21. Hence, the fixing film 20 increases a length of the heater 22 in the sheet conveyance direction FP so that the fixing device 9 is employed by the image forming apparatus 100 that prints at a high speed. As the film diameter of the fixing film 20 increases, deformation of the entirety of the fixing film 20 decreases with respect to the length of the fixing nip N in the sheet conveyance direction FP. Thus, the fixing film 20 suppresses deformation thereof and the separator 310 separates the sheet P stably.

However, if the length of the heater 22 in the sheet conveyance direction FP increases excessively, deformation of the fixing film 20 may increase. Hence, the length of the heater 22 in the sheet conveyance direction FP is adjusted to a proper size.

The fixing device 9 further includes a biasing member that biases the pressure roller 21 toward the fixing film 20, pressing the pressure roller 21 against the heater 22 via the fixing film 20. Thus, the fixing nip N is formed between the fixing film 20 and the pressure roller 21. The fixing device 9 further includes a driver 40 that drives and rotates the pressure roller 21. As the pressure roller 21 rotates in the forward direction F21, the pressure roller 21 drives and rotates the fixing film 20 in the forward direction F20. The fixing device 9 further includes a thermistor 28 that is disposed opposite the pressure roller 21 and detects a temperature of the pressure roller 21.

Since the fixing film 20 is driven and rotated by the pressure roller 21, the fixing film has a diameter (e.g., a film diameter) that is greater than sizes of interior elements such as the heater 22 and the heater holder 23 that are disposed within a loop formed by the fixing film 20. As the film diameter of the fixing film 20 increases, change in an orbit of the fixing film 20 also increases. However, the fixing device 9 according to the embodiment has a configuration described below that suppresses change in the orbit of the fixing film 20. Accordingly, the separator 310 separates the sheet P stably.

The heater 22 is a laminated heater that extends in a longitudinal direction thereof throughout an entire span of the fixing film 20 in a longitudinal direction thereof. The heater 22 includes a base 30 that is platy, resistive heat generators 31 that are disposed on the base and an insulating layer 32 that coats the resistive heat generators 31. The insulating layer 32 of the heater 22 contacts the inner circumferential face 20*a* of the fixing film 20. The resistive heat generators 31 generate heat that is conducted to the fixing film 20 through the insulating layer 32.

The fixing device 9 may further include a thermal conductor that is sandwiched between the heater 22 and the heater holder 23. The thermal conductor has one face that contacts a back face of the heater 22 and another face that contacts the heater holder 23.

The thermal conductor improves evenness of heat generated by the heater 22 in the longitudinal direction thereof, thus enhancing quality of an image formed on a sheet P. The thermal conductor is made of a material having a thermal conductivity greater than a thermal conductivity of the base 30 of the heater 22, such as graphene and graphite described below with reference to FIGS. 11 and 12.

According to the embodiment, the base 30 has a fixing film opposed face that is disposed opposite the fixing film 20 and the fixing nip N. The fixing film opposed face mounts the resistive heat generators 31 and the insulating layer 32. Alternatively, the resistive heat generators 31 and the insulating layer 32 may be mounted on a heater holder opposed face of the base 30, which is disposed opposite the heater holder 23. In this case, heat generated by the resistive heat generators 31 is conducted to the fixing film 20 through the base 30. Hence, the base 30 is preferably made of a material having an enhanced thermal conductivity, such as aluminum nitride. The base 30 made of the material having the enhanced thermal conductivity causes the resistive heat generators 31 to heat the fixing film sufficiently, even if the resistive heat generators 31 are mounted on the heater holder opposed face of the base 30, which is opposite to the fixing film opposed face of the base 30.

The heater holder 23 and the stay 24 are disposed within the loop formed by the fixing film 20. The stay 24 includes a channel made of metal. The stay 24 has both lateral ends in a longitudinal direction thereof, that are supported by side plates of the fixing device 9, respectively. Since the stay 24 supports the heater holder 23 and the heater 22 supported by the heater holder 23, in a state in which the pressure roller 21 is pressed against the fixing film the heater 22 receives pressure from the pressure roller 21 precisely to form the fixing nip N stably.

Since the heater holder 23 is subject to high temperatures by heat from the heater 22, the heater holder 23 is preferably made of a heat-resistant material. For example, if the heater holder 23 is made of heat-resistant resin having a decreased thermal conductivity, such as liquid crystal polymer (LCP), the heater holder 23 suppresses conduction of heat thereto from the heater 22, facilitating heating of the fixing film 20.

In order to decrease a contact area where the heater holder 23 contacts the heater 22 and thereby reduce an amount of heat conducted from the heater 22 to the heater holder 23, the heater holder 23 includes a plurality of projections 23*a* that contacts the base 30 of the heater 22. According to the embodiment, the projections 23*a* of the heater holder 23 do not contact a part of the heater holder opposed face of the base 30, which is opposite to the resistive heat generators 31 mounted on the fixing film opposed face of the base 30, that is, a part of the base 30, which is susceptible to temperature increase, thus decreasing the amount of heat conducted to the heater holder 23 further and causing the heater 22 to heat the fixing film 20 efficiently.

The heater holder 23 mounts a plurality of guides 26 that guides the fixing film 20. The guides 26 are disposed upstream from and below the heater 22 and disposed downstream from and above the heater 22 in FIG. 2, respectively, in the forward direction F20 of the fixing film 20.

Figure 3:
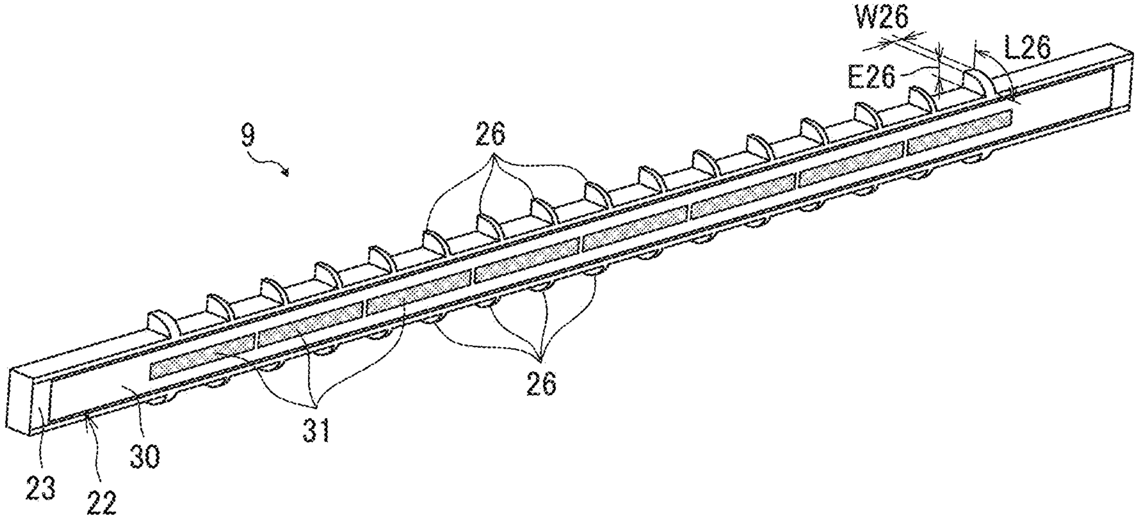
FIG. 3 is a perspective view of a heater, a heater holder, and guides incorporated in the fixing device depicted in FIG. 2.

As illustrated in FIG. 3, the plurality of guides 26 disposed upstream and downstream from the heater 22 in the forward direction F20 of the fixing film 20 is arranged in the longitudinal direction of the heater 22, that is, the longitudinal direction of the fixing film 20, with a gap between the adjacent guides 26. Each of the guides 26 is substantially fan-shaped. As illustrated in FIG. 2, each of the guides 26 includes a fixing film opposed face 260 that is disposed opposite the inner circumferential face 20*a* of the fixing film 20 and defines an arc or a projecting curved face that extends in a circumferential direction of the fixing film 20. As illustrated in FIG. 3, according to the embodiment, each of the guides 26 disposed at both lateral ends of the heater 22 in the longitudinal direction thereof has a width W26 that is greater than a width W26 of each of other guides 26. However, each of the guides 26 has a length L26 (e.g., a circumferential length) in the circumferential direction of the fixing film 20 and a height E26, which are common.

In the fixing device 9 according to the embodiment, when printing starts, the driver drives and rotates the pressure roller 21 and the fixing film 20 starts rotation in accordance with rotation of the pressure roller 21. Since the inner circumferential face 20*a* of the fixing film 20 is contacted and guided by the fixing film opposed face 260 of each of the guides 26, the fixing film 20 rotates stably and smoothly.

Additionally, as power is supplied to the resistive heat generators 31 of the heater 22, the heater 22 heats the fixing film 20. In a state in which the temperature of the fixing film 20 reaches a predetermined target temperature (e.g., a fixing temperature), as a sheet P bearing an unfixed toner image T is conveyed through the fixing nip N formed between the fixing film and the pressure roller 21 in the sheet conveyance direction FP as illustrated in FIG. 2, the fixing film 20 and the pressure roller 21 fix the unfixed toner image T on the sheet P under heat and pressure.

A description is provided of a construction of the heater 22.

Figure 4:
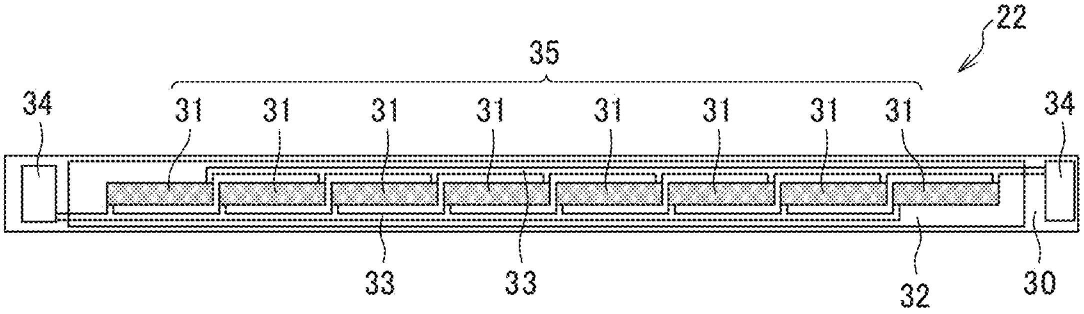
FIG. 4 is a plan view of the heater depicted in FIG. 3.

FIG. 4 is a plan view of the heater 22 according to the embodiment. As illustrated in FIG. 4, the heater 22 according to the embodiment includes the plurality of resistive heat generators 31 arranged in the longitudinal direction of the heater 22, that is, the longitudinal direction of the fixing film 20, with a gap between the adjacent resistive heat generators 31.

In other words, the heater 22 includes a heat generation portion 35 that is divided into the plurality of resistive heat generators 31 arranged in the longitudinal direction of the fixing film 20. The heat generation portion 35 may be divided into at least three or four parts that construct lateral end heaters and a center heater. The lateral end heaters are disposed opposite and heat both lateral end spans of the fixing film 20 in the longitudinal direction thereof, respectively. The center heater is disposed opposite and heats a center span of the fixing film in the longitudinal direction thereof.

If the heat generation portion 35 of the heater 22 is divided into the plurality of resistive heat generators 31, the heater 22 has an increased length in the sheet conveyance direction FP. Accordingly, the fixing nip N has an increased length in the sheet conveyance direction FP. Consequently, the fixing film 20 is more subject to deformation, increasing change in the orbit of the fixing film 20. However, the fixing device 9 according to the embodiment suppresses change in the orbit of the fixing film 20 as described below. Hence, the fixing device 9 properly employs the heater 22 incorporating the heat generation portion that is divided into the plurality of resistive heat generators 31.

The resistive heat generators 31 are electrically connected in parallel to a pair of electrodes 34 through a plurality of feeders 33. The electrodes 34 are mounted on both lateral ends of the base 30 in a longitudinal direction thereof, respectively. Each of the feeders 33 is made of a conductor having a resistance value smaller than a resistance value of the resistive heat generator 31.

The adjacent resistive heat generators 31 define the gap therebetween, that is 0.2 mm or greater, preferably 0.4 mm or greater, in view of ensuring insulation between the adjacent resistive heat generators 31. If the gap between the adjacent resistive heat generators 31 is excessively great, the fixing film 20 is subject to temperature decrease at an opposed portion thereon that is disposed opposite the gap. Hence, the gap is 5 mm or smaller, preferably 1 mm or smaller, in view of suppressing uneven temperature of the fixing film 20 in the longitudinal direction thereof.

The resistive heat generators 31 are made of a material having a positive temperature coefficient (PTC) property that is characterized in that the resistance value increases, that is, a heater output decreases, as the temperature increases. Accordingly, if a sheet P having a decreased width that is smaller than an entire length of the heat generation portion 35 in the longitudinal direction of the heater 22 is conveyed through the fixing nip N, for example, since the sheet P does not draw heat from the fixing film 20 in an outboard span that is outboard from the sheet P in the longitudinal direction of the fixing film 20, the resistive heat generators 31 in the outboard span are subject to temperature increase.

Since a constant voltage is applied to the resistive heat generators 31, when the temperature of the resistive heat generators 31 in the outboard span increases and the resistance value thereof increases, conversely, an output (e.g., a heat generation amount) from the resistive heat generators 31 decreases relatively, suppressing temperature increase of the resistive heat generators 31 that are disposed at both lateral ends of the heat generation portion in a longitudinal direction thereof. Additionally, the plurality of resistive heat generators 31 is electrically connected in parallel, suppressing temperature increase in a non-conveyance span where the sheet P is not conveyed over the fixing film 20 while retaining the printing speed.

Alternatively, the heat generation portion 35 may include heat generators other than the resistive heat generators 31 having the PTC property. As illustrated in FIG. 4, each of the resistive heat generators 31 is aligned in the longitudinal direction of the heater 22 to define a single column in a short direction of the heater 22. Alternatively, the resistive heat generators 31 may define a plurality of columns in the short direction of the heater 22.

For example, the resistive heat generator 31 is produced as below. Silver-palladium (AgPd), glass powder, and the like are mixed into paste. The paste coats the base 30 by screen printing or the like. Thereafter, the base 30 is subject to firing. According to the embodiment, the resistive heat generator 31 has a resistance value of 80Ω at an ambient temperature.

Alternatively, the resistive heat generator 31 may be made of a resistive material such as a silver alloy (AgPt) and ruthenium oxide ($RuO_2$). The feeders 33 and the electrodes 34 are made of a material prepared with silver (Ag) or silver-palladium (AgPd) by screen printing or the like.

The base 30 is preferably made of ceramics, such as alumina and aluminum nitride, or a nonmetallic material, such as glass and mica, which has an enhanced heat resistance and an enhanced insulation. According to the embodiment, the base 30 is made of alumina and has a short width of 8 mm, a longitudinal length of 270 mm, and a thickness of 1.0 mm.

Alternatively, the base 30 may include a conductive layer made of metal or the like and an insulating layer disposed on the conductive layer. The metal is preferably aluminum, stainless steel, or the like that is available at reduced costs. In order to improve evenness of heat conducted from the heater 22 so as to enhance quality of an image formed on a sheet P, the base 30 may be made of a material that has an increased thermal conductivity such as copper, graphite, and graphene.

The insulating layer 32 is made of heat-resistant glass and has a thickness of 75 μm, for example. The insulating layer 32 covers the resistive heat generators 31 and the feeders 33 and insulates and protects the resistive heat generators 31 and the feeders 33 while retaining smooth sliding of the fixing film 20 over the heater 22.

Figure 5:
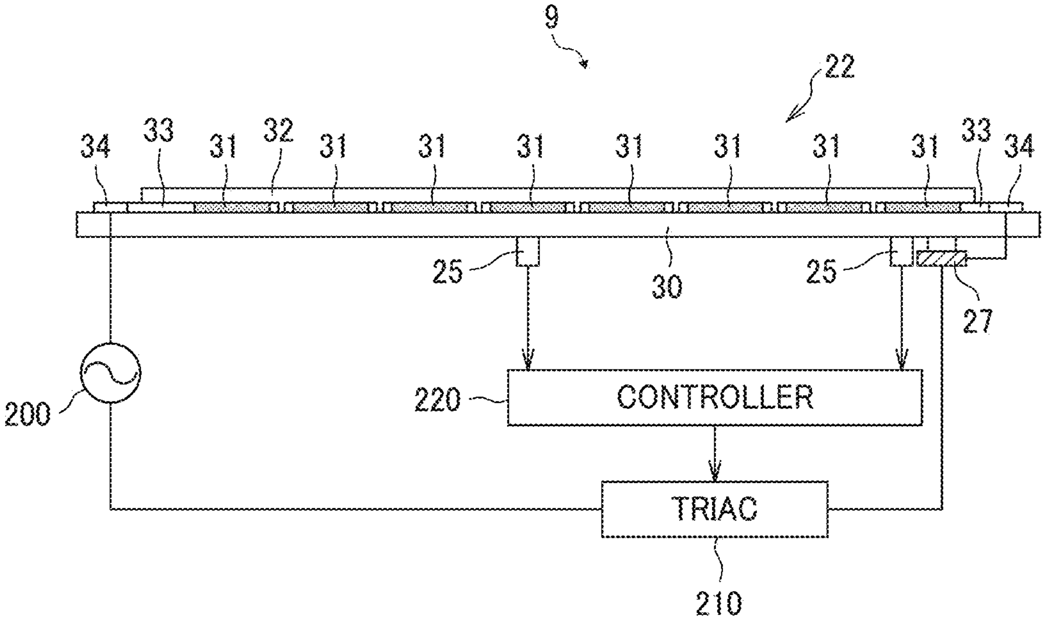
FIG. 5 is a diagram of a power supply circuit that supplies power to the heater depicted in FIG. 4.

FIG. 5 is a diagram of the heater 22 according to the embodiment, illustrating a power supply circuit that supplies power to the heater 22.

As illustrated in FIG. 5, according to the embodiment, the power supply circuit for supplying power to the resistive heat generators 31 includes an alternating current power supply 200 that is electrically connected to the electrodes 34 of the heater 22. The power supply circuit further includes a triac 210 that controls an amount of power supplied to the resistive heat generators 31.

The power supply circuit further includes a controller 220 that controls the amount of power supplied to the resistive heat generators 31 through the triac 210 based on temperatures of the heater 22, that are detected by the thermistors 25 serving as the temperature detectors, respectively. The controller 220 includes a microcomputer that includes a central processing unit (CPU), a read only memory (ROM), a random access memory (RAM), and an input-output (I/O) interface.

According to the embodiment, the thermistors 25 serving as the temperature detectors are disposed opposite a center span of the heater 22 in the longitudinal direction thereof, that is, a minimum sheet conveyance span where a minimum size sheet P available in the fixing device 9 is conveyed, and one lateral end span of the heater 22 in the longitudinal direction thereof, respectively. The fixing device 9 further includes a thermostat 27 serving as a circuit breaker that is disposed at one lateral end of the heater 22 in the longitudinal direction thereof. The thermostat 27 interrupts supplying power to the resistive heat generators 31 when a temperature of the resistive heat generator 31 is a predetermined temperature or higher. The thermistors 25 and the thermostat 27 contact a back face of the base 30, which is opposite to a front face of the base 30, which mounts the resistive heat generators 31. Each of the thermistors 25 and the thermostat 27 detects the temperature of the resistive heat generator 31.

Figure 6:
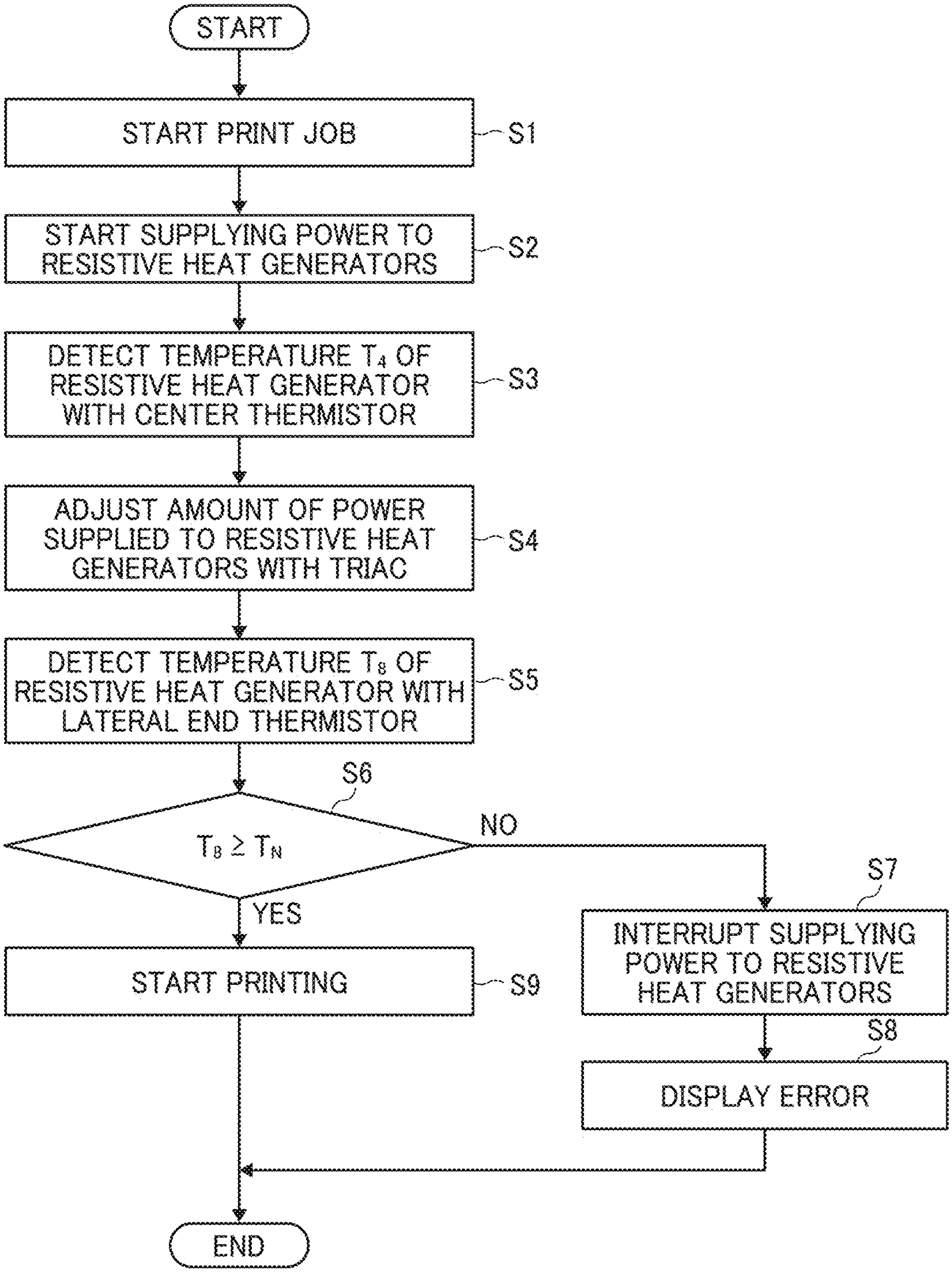
FIG. 6 is a flowchart illustrating control processes for controlling the heater depicted in FIG. 5.

Referring to FIG. 6 illustrating a flowchart, a description is provided of control processes for controlling the heater 22 according to the embodiment.

As illustrated in FIG. 6, in step S1, the image forming apparatus 100 starts a print job. In step S2, the controller 220 causes the alternating current power supply 200 to start supplying power to the resistive heat generators 31 of the heater 22.

Accordingly, the resistive heat generators 31 start generating heat, heating the fixing film 20. In step S3, the thermistor 25, that is, a center thermistor, disposed opposite the center span of the heater 22 in the longitudinal direction thereof, detects a temperature $T_4$ of the resistive heat generator 31 disposed in the center span of the heater 22 in the longitudinal direction thereof. In step S4, based on the temperature $T_4$ sent from the thermistor 25, that is, the center thermistor, the controller 220 controls the triac 210 to adjust the amount of power supplied to the resistive heat generators 31 so that the resistive heat generators 31 attain a predetermined temperature.

Simultaneously, in step S5, the thermistor 25, that is, a lateral end thermistor, disposed opposite the lateral end span of the heater 22 in the longitudinal direction thereof, also detects a temperature $T_8$ of the resistive heat generator 31 disposed in the lateral end span of the heater 22 in the longitudinal direction thereof. In step S6, the controller 220 determines whether the temperature $T_8$ of the resistive heat generator 31, that is detected by the thermistor 25 serving as the lateral end thermistor, is a predetermined temperature $T_N$ or higher ($T_8 \geq T_N$). If the controller 220 determines that the temperature $T_8$ of the resistive heat generator 31 is lower than the predetermined temperature $T_N$ (NO in step S6), the controller 220 determines that an abnormally decreased temperature (e.g., disconnection) generates and interrupts supplying power to the resistive heat generators 31 of the heater 22 in step S7. In step S8, the controller 220 causes a control panel of the image forming apparatus 100 to display an error. Conversely, if the controller 220 determines that the temperature $T_8$ of the resistive heat generator 31, that is detected by the thermistor 25, is the predetermined temperature $T_N$ or higher (YES in step S6), the controller 220 determines that no abnormally decreased temperature generates and starts printing in step S9.

If the controller 220 does not perform temperature control based on the temperature detected by the thermistor 25, that is, the center thermistor, due to breakage, disconnection, or the like of the resistive heat generator 31, the resistive heat generator 31 disposed in the lateral end span of the heater 22 in the longitudinal direction thereof and other resistive heat generators 31 may suffer from an abnormally increased temperature (e.g., overheating). In this case, when the temperature of the resistive heat generator 31 reaches the predetermined temperature $T_N$ or higher, the controller 220 activates the thermostat 27 to interrupt supplying power to the resistive heat generators 31, preventing the resistive heat generators 31 from suffering from the abnormally increased temperature.

A description is provided of a configuration of the separator 310.

Figure 7A:
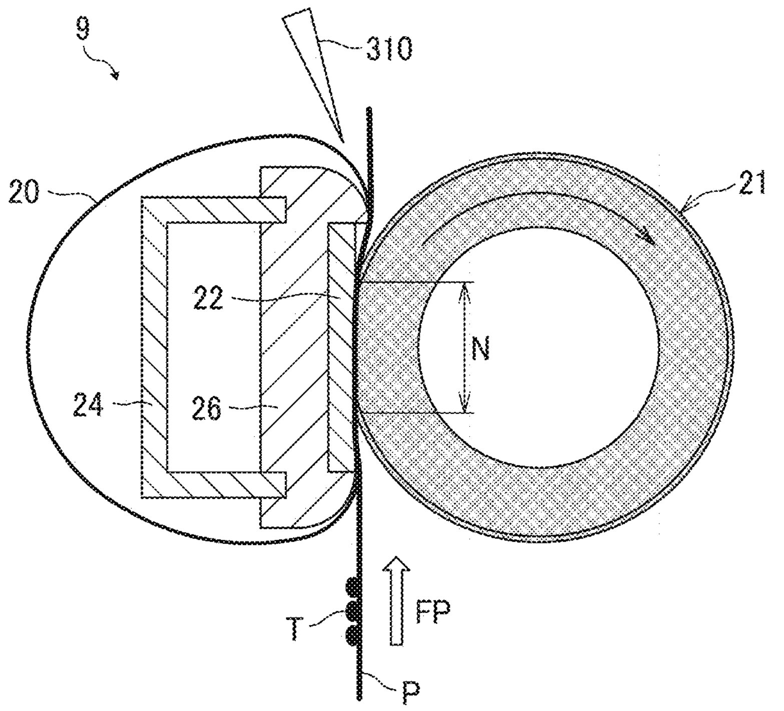
FIG. 7A is a cross-sectional view of the fixing device depicted in FIG. 2, illustrating a separator incorporated therein.

FIG. 7A is a schematic cross-sectional view of the fixing device 9 incorporating the separator 310 that separates the sheet P that has passed through the fixing nip N from the fixing film 20. The separator 310 is disposed downstream from the fixing nip N in the sheet conveyance direction FP and disposed above the fixing nip N in FIG. 7A. The separator 310 includes a separation plate. The separator 310 separates the sheet P from the fixing film 20.

The separator 310 is made of heat-resistant metal or heat-resistant resin. For example, the heat-resistant metal is stainless steel.

For example, the heat-resistant resin is polyimide, PEEK, or the like. Alternatively, the separator 310 may be made of a material other than metal and resin as long as the material is heat-resistant.

FIG. 7A illustrates the fixing device 9 incorporating the separator 310 that is secured inside the fixing device 9. FIG. 7B illustrates a fixing device 9A incorporating a separation shaft 322 that supports the separator 310 such that the separator 310 pivots about the separation shaft 322. The separator 310 extends parallel to an axial direction, that is, the longitudinal direction, of the fixing film 20. The separator 310 is greater than the sheet P in the axial direction of the fixing film 20. The separator 310 includes a front edge that is disposed opposite the fixing film 20 with a gap therebetween. The gap has a size in a range of from 0.2 mm to 2.0 mm, for example.

Figure 7B:
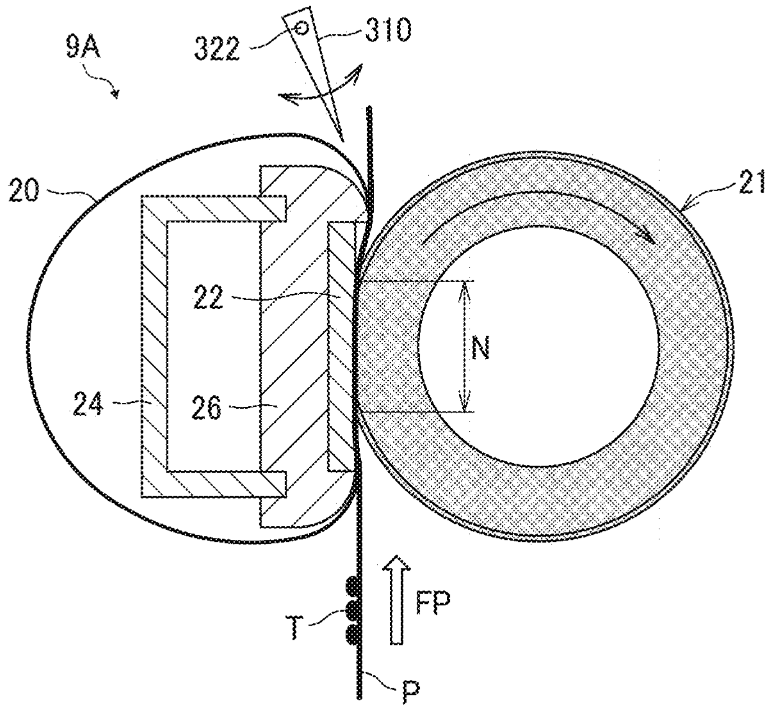
FIG. 7B is a cross-sectional view of a fixing device according to another embodiment of the present disclosure, illustrating the separator depicted in FIG. 7A incorporated therein.

As illustrated in FIG. 7B, the separator 310 pivots in response to motion of the fixing film 20. Thus, the separator 310 does not come into contact with the fixing film 20. The fixing device 9A depicted in FIG. 7B includes a pair of side plates. The separation shaft 322 projects from an interior face of each of the side plates. The separator 310 includes each lateral end in a longitudinal direction thereof, that is supported by the separation shaft 322 such that the separator 310 pivots about the separation shaft 322.

A description is provided of deformation of the fixing film 20.

As described above, the fixing film 20 is made of polyimide or the like as heat-resistant resin. Since the fixing film 20 is thin, the fixing film 20 is subject to substantial deformation while the fixing film 20 interrupts rotation. If the fixing film 20 rotates in a state in which the fixing film 20 suffers from the substantial deformation, the fixing film 20 may suffer from irregular change in the orbit.

Figure 7C:
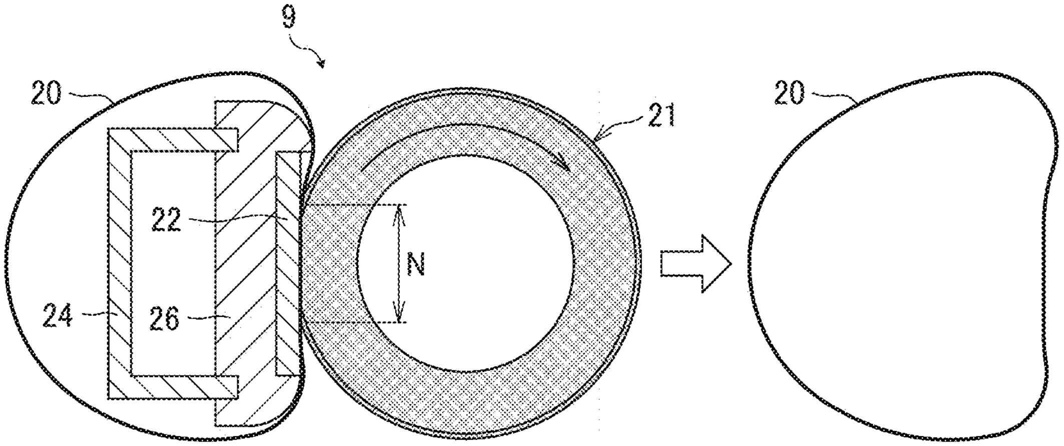
FIG. 7C is a cross-sectional view of the fixing device depicted in FIG. 7A, illustrating a fixing film that is incorporated therein and suffers from deformation.

For example, while the fixing film 20 interrupts rotation, the fixing film 20 sandwiched between the heater 22 and the pressure roller 21 at the fixing nip N suffers from planar deformation as illustrated in a right part in FIG. 7C. The fixing film 20 has a cooldown time that is substantially different from a cooldown time of the heater 22. Hence, the fixing film 20 is more subject to deformation. The fixing device 9 does not incorporate a restrictor that is disposed within the loop formed by the fixing film 20 and restricts deformation of the fixing film 20. Accordingly, if the fixing film 20 resumes rotation in a state in which the fixing film 20 suffers from deformation as illustrated in the right part in FIG. 7C, the fixing film 20 may suffer from irregular change in the orbit with a warped shape (e.g., flapping) as illustrated with a chain line in FIG. 7D.

A description is provided of motion of the separator 310.

Figure 7D:
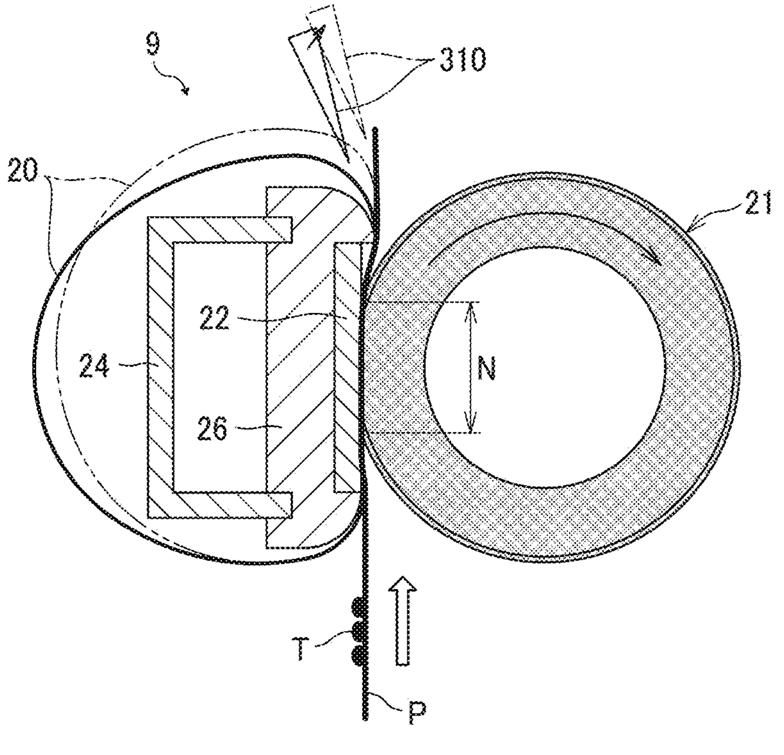
FIG. 7D is a cross-sectional view of the fixing device depicted in FIG. 7A, illustrating the fixing film that comes into contact with the separator.

If the fixing film 20 suffers from irregular change in the orbit with the warped shape as illustrated with the chain line in FIG. 7D, the fixing film 20 may come into contact with an element disposed in proximity to the fixing film 20, such as the separator 310. In order to prevent the fixing film 20 from coming into contact with the separator 310, the separator 310 may separate from the orbit of the fixing film 20 as illustrated with a chain line in FIG. 7D. However, the separator 310 may suffer from degradation in separation of the sheet P from the fixing film 20. If the element disposed in proximity to the fixing film 20 is separated from the orbit of the fixing film 20, the fixing device 9 may suffer from limitation in a layout that saves space.

A description is provided of a construction of a first comparative fixing device.

The first comparative fixing device includes a fixing roller and a separator disposed in proximity to the fixing roller. The separator separates a sheet from the fixing roller. The separator is disposed opposite the fixing roller with a gap therebetween. If the gap is excessively small, the separator may come into contact with the fixing roller, damaging the fixing roller easily and resulting in formation of a faulty image.

Conversely, if the gap between the separator and the fixing roller is excessively great, the sheet may pass through the excessively great gap and may be wound around the fixing roller. Accordingly, the sheet may be jammed easily and the separator may not separate the sheet stably. Hence, the separator is requested to be closer to the fixing roller without contacting the fixing roller.

A description is provided of a construction of a second comparative fixing device for on-demand fusing.

The second comparative fixing device employs a surface rapid fusing (SURF) system that uses a fixing film instead of a fixing roller. The fixing film is thin and has a decreased thermal capacity. The second comparative fixing device includes a support stay and a laminated heater that are disposed within a loop formed by the fixing film and disposed opposite a pressure roller. Each of the support stay and the laminated heater has a decreased thermal capacity and supports the fixing film without applying tension to the fixing film. As the pressure roller rotates, the pressure roller drives and rotates the fixing film.

The fixing film is made of heat-resistant resin, for example, polyimide mainly. The fixing film made of polyimide deforms flexibly at a high temperature of 100 degrees Celsius or higher. Accordingly, even if the fixing film deforms at a fixing nip formed between the fixing film and the pressure roller, the fixing film reverts to an original tubular shape quickly. However, if the fixing film is left being pressed by the pressure roller at the fixing nip for a long time, the fixing film may retain a deformed shape that fits the fixing nip. Accordingly, the fixing film having the tubular shape normally may deform to an abnormal shape (e.g., a flat spot).

When the second comparative fixing device restarts after the fixing film is left being pressed by the pressure roller for a long time, since the second comparative fixing device is not warmed up sufficiently, the fixing film may contact a separator. Accordingly, the separator may damage the fixing film or may suffer from unstable separation performance for separating a sheet from the fixing film. Additionally, the fixing film may contact the pressure roller abnormally, generating fluctuation in rotation, noise, and fluctuation in fixing performance for fixing a toner image on a sheet.

To address the above-described circumstances of the first comparative fixing device and the second comparative fixing device, each of the fixing devices 9 and 9A serving as the nip forming unit or the nip forming device according to the embodiments of the present disclosure employs methods described below that suppress deformation of the fixing film 20.

A description is provided of a method for suppressing deformation of the fixing film 20.

Figure 8A:
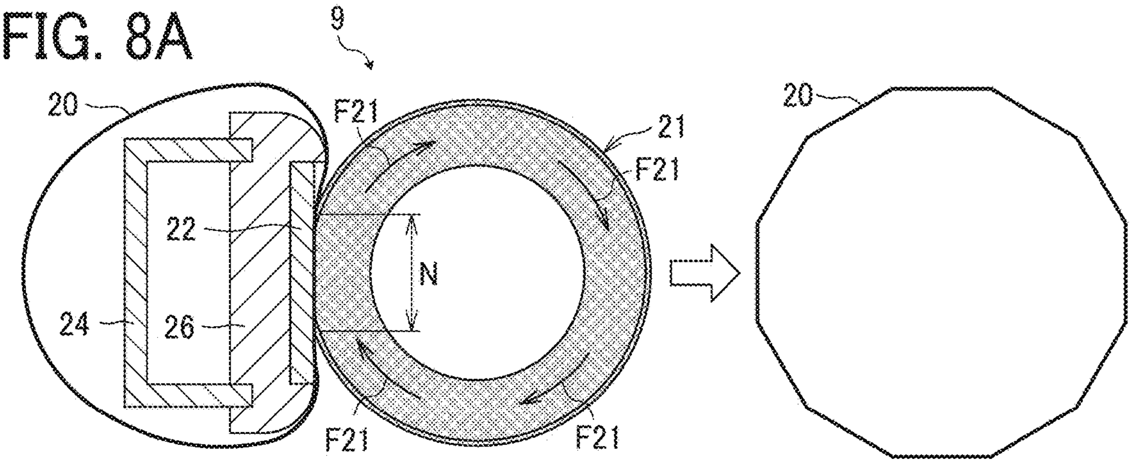
FIG. 8A is a cross-sectional view of the fixing device depicted in FIG. 7A, illustrating a method for suppressing deformation of the fixing film.
Figure 8B:
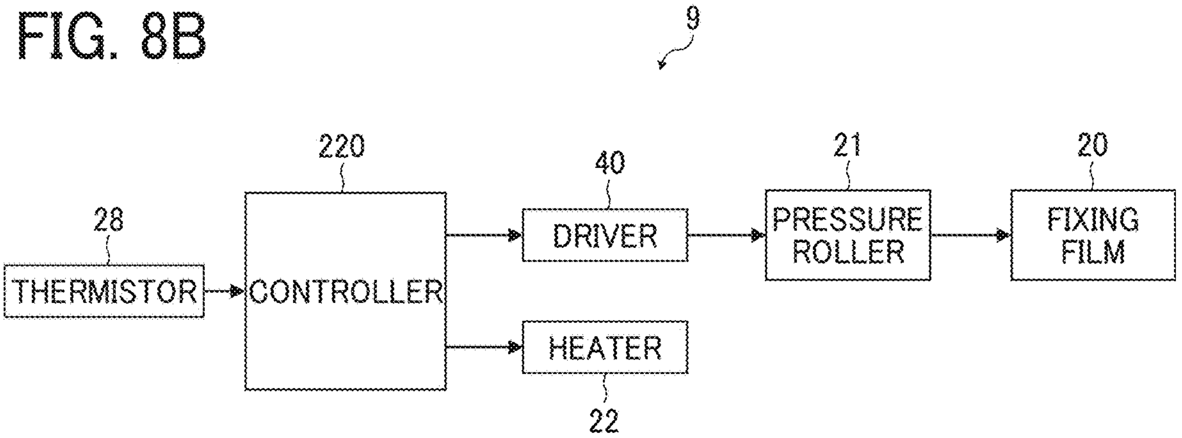
FIG. 8B is a block diagram of the fixing device depicted in FIG. 8A, illustrating a controller incorporated therein.

FIGS. 8A and 8B illustrate the method for suppressing deformation of the fixing film 20.

As illustrated in FIG. 8B, the fixing device 9 includes the driver 40 (e.g., a motor) that drives and rotates the pressure roller 21. Whenever the controller 220 controls the driver to interrupt rotation of the pressure roller 21, the fixing film 20 stops at different stop positions. For example, the fixing film 20 stops at a stop position that is shifted from a former stop position step by step. Accordingly, as illustrated in a right part in FIG. 8A, deformation (e.g., flat spots) of the fixing film 20 is divided into a plurality of parts in the circumferential direction of the fixing film 20.

Consequently, the fixing film 20 is immune from substantial deformation illustrated in FIG. 7C. Additionally, the fixing device 9 also suppresses compression set of the pressure roller 21.

The fixing device 9 depicted in FIG. 8B includes the driver 40 and the controller 220. Alternatively, the driver 40 and the controller 220 may be disposed outside the fixing device 9 and disposed inside the image forming apparatus 100 depicted in FIG. 1.

Figure 9A:
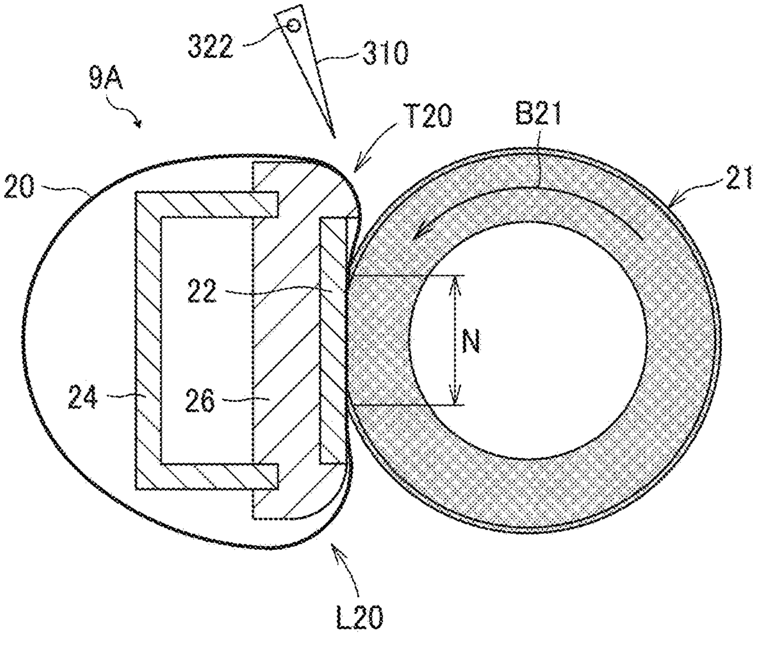
FIG. 9A is a cross-sectional view of the fixing device depicted in FIG. 7B, illustrating a method for suppressing deformation of the fixing film by rotating the fixing film backward and interrupting rotation of the fixing film.
Figure 9B:
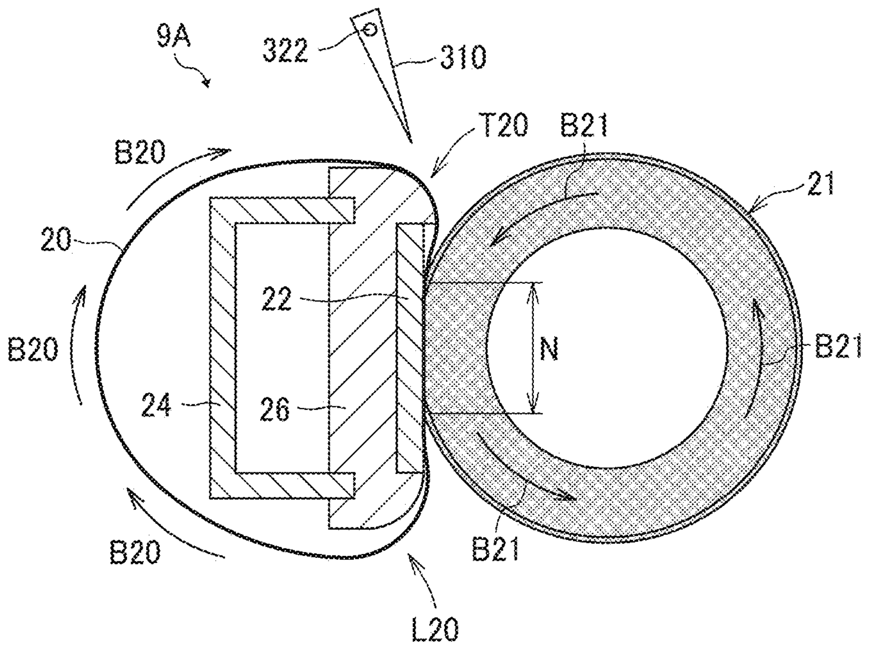
FIG. 9B is a cross-sectional view of the fixing device depicted in FIG. 7B, illustrating a method for suppressing deformation of the fixing film by rotating the fixing film backward intermittently and interrupting rotation of the fixing film.
Figure 9C:
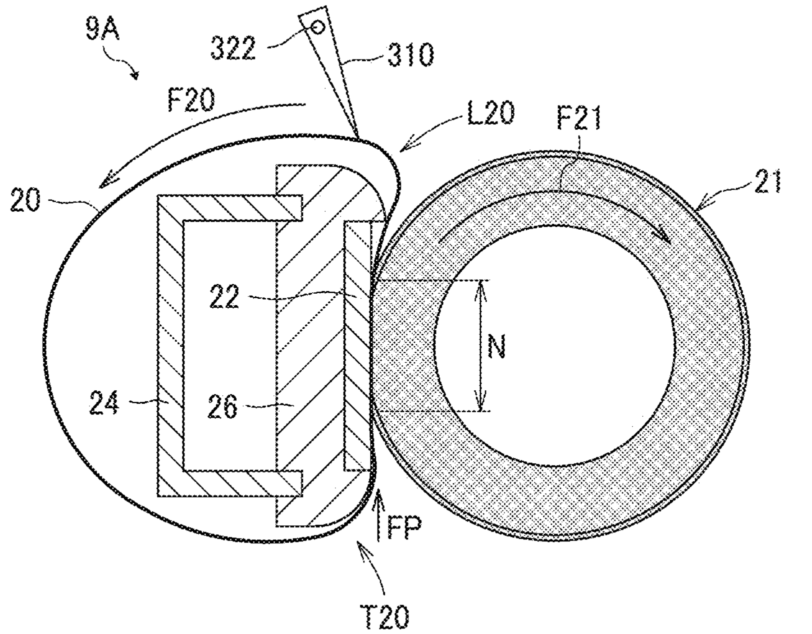
FIG. 9C is a cross-sectional view of the fixing device depicted in FIG. 7B, illustrating the fixing film that comes into contact with the separator if the fixing film rotates forward and interrupts rotation.

Referring to FIGS. 9A, 9B, and 9C, a description is provided of starting and interruption of backward rotation of the pressure roller 21.

As illustrated in FIG. 8A, the flat spots of the fixing film 20 are divided into the plurality of parts in the circumferential direction of the fixing film 20, respectively. However, when the fixing film 20 halts, the fixing film 20 is stretched and bulged at an upstream position and a downstream position disposed upstream and downstream from the fixing nip N in the forward direction F20 of the fixing film 20, respectively. For example, as illustrated in FIG. 9C, when the fixing film 20 rotates forward in the forward direction F20 in which the fixing film 20 conveys the sheet P in the sheet conveyance direction FP and interrupts forward rotation, the fixing film 20 suffers from a stretch T20 and a slack L20 at the upstream position and the downstream position disposed upstream and downstream from the fixing nip N in the forward direction F20 of the fixing film 20, respectively. FIG. 9C illustrates the pressure roller 21 that rotates forward in the forward direction F21 and interrupts forward rotation.

In a state in which the fixing film 20 has the stretch T20 and the slack L20, as the controller 220 controls the driver 40 to restart the pressure roller 21 and drive and rotate the pressure roller 21 clockwise in FIG. 9C in the forward direction F21, the pressure roller 21 drives and rotates the fixing film 20 in the forward direction F20. Accordingly, the slack L20 at the downstream position on the fixing film 20 may further bulge downstream in the forward direction F20 of the fixing film 20 and may come into contact with the separator 310. Starting or restarting denotes reverting the pressure roller 21 that interrupts rotation to a state in which the pressure roller 21 drives and rotates the fixing film 20.

According to an embodiment of the present disclosure, after the fixing film 20 interrupts rotation while the heater 22 is turned off, as illustrated in FIG. 9A, the controller 220 controls the driver 40 to drive and rotate the pressure roller 21 backward for a predetermined time in a backward direction B21 that is opposite to the forward direction F21 depicted in FIG. 9C in which the pressure roller 21 conveys the sheet P in the sheet conveyance direction FP. Thereafter, the controller 220 controls the driver 40 to stop the pressure roller 21. FIG. 9A illustrates the pressure roller 21 that rotates backward in the backward direction B21 and interrupts backward rotation. Accordingly, the slack L20 and the stretch T20 remain at the upstream position and the downstream position disposed upstream and downstream from the fixing nip N in the sheet conveyance direction FP, respectively.

The stretch T20 is in contact with or disposed in proximity to the guide 26. Hence, in a state in which the fixing film 20 has the slack L20 and the stretch T20 as illustrated in FIG. 9A, even if the controller 220 controls the driver 40 to restart the pressure roller 21 and drive and rotate the pressure roller 21 clockwise in FIG. 9C in the forward direction F21 so that the pressure roller 21 drives and rotates the fixing film 20, the stretch T20 disposed at the downstream position does not bulge downstream in the sheet conveyance direction FP and slides over the guide 26 leftward in FIG. 9A. Thus, the fixing film 20 does not come into contact with the separator 310.

The controller 220 controls the driver 40 to drive and rotate the pressure roller 21 backward in the backward direction B21 at a rotation speed that is lower than a rotation speed at which the pressure roller 21 rotates forward in the forward direction F21 to convey the sheet P in the sheet conveyance direction FP. Since the driver 40 drives and rotates the pressure roller 21 backward at the lower rotation speed, the pressure roller 21 decreases a load imposed on a slide portion of the fixing film 20, that slides over the guide 26, thus extending a life of the fixing film 20.

A description is provided of starting and interruption of intermittent backward rotation of the pressure roller 21.

FIG. 9B illustrates the pressure roller 21 that starts and interrupts intermittent backward rotation. As illustrated in FIG. 9B, after the fixing film 20 interrupts rotation while the heater 22 is turned off, the controller 220 controls the driver 40 to drive and rotate the pressure roller 21 backward intermittently for a predetermined time in the backward direction B21 that is opposite to the forward direction F21 in which the pressure roller 21 conveys the sheet P in the sheet conveyance direction FP. Thereafter, the controller 220 controls the driver to stop the pressure roller 21. For example, the controller 220 controls the driver 40 to drive and rotate the pressure roller 21 backward with short intermittence. Accordingly, as the pressure roller 21 rotates the fixing film 20 backward in a backward direction B20 intermittently, the fixing film 20 conducts or dissipates residual heat on the heater 22 and the guide 26 at the fixing nip N to the upstream position disposed upstream from the fixing nip N in the sheet conveyance direction FP.

The fixing film 20 decreases the temperature of the heater 22 and the guide 26. Additionally, the fixing film 20 is cooled evenly in the circumferential direction thereof, attaining reduced deformation. Accordingly, the fixing film 20 reduces a temperature difference between a temperature at the fixing nip N and a temperature at each of the upstream position and the downstream position disposed upstream and downstream from the fixing nip N in the sheet conveyance direction FP, respectively. Consequently, after the controller 220 controls the driver 40 to restart the pressure roller 21, the fixing film 20 suppresses irregular change in the orbit (e.g., flapping).

As illustrated in FIG. 9A, when the controller 220 controls the driver 40 to drive and rotate the pressure roller 21 in the backward direction B21 continuously, if the pressure roller 21 rotates in a substantial rotation amount, a risk of damaging the slide portion of the fixing film 20 may increase. Conversely, as illustrated in FIG. 9B, when the controller 220 controls the driver 40 to drive and rotate the pressure roller 21 in the backward direction B21 with short intermittence, the pressure roller 21 rotates the fixing film 20 in a minimum rotation amount, decreasing the risk of damaging the fixing film 20.

For example, the pressure roller 21 drives and rotates the fixing film 20 backward in the backward direction B20 intermittently by 80 degrees for one driving. After the pressure roller 21 interrupts rotation of the fixing film 20 for a predetermined interruption time (e.g., seconds), the pressure roller 21 rotates the fixing film 20 in the backward direction B20 by degrees again. Thus, the pressure roller 21 drives and rotates the fixing film 20 backward repeatedly for several times.

Figure 10A:
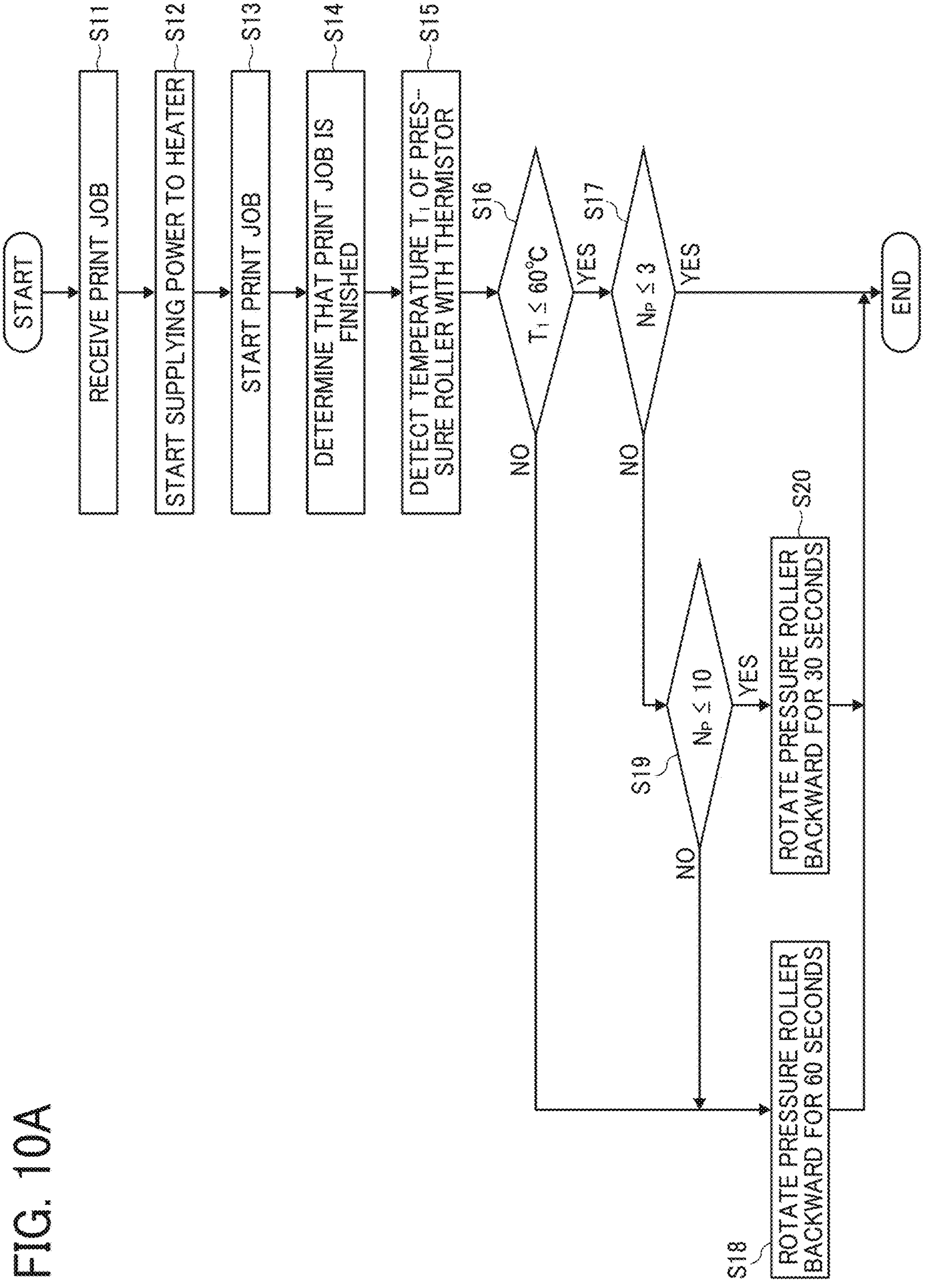
FIG. 10A is a flowchart illustrating control processes performed by the controller depicted in FIG. 8B to control rotation of the fixing film.
Figure 10B:
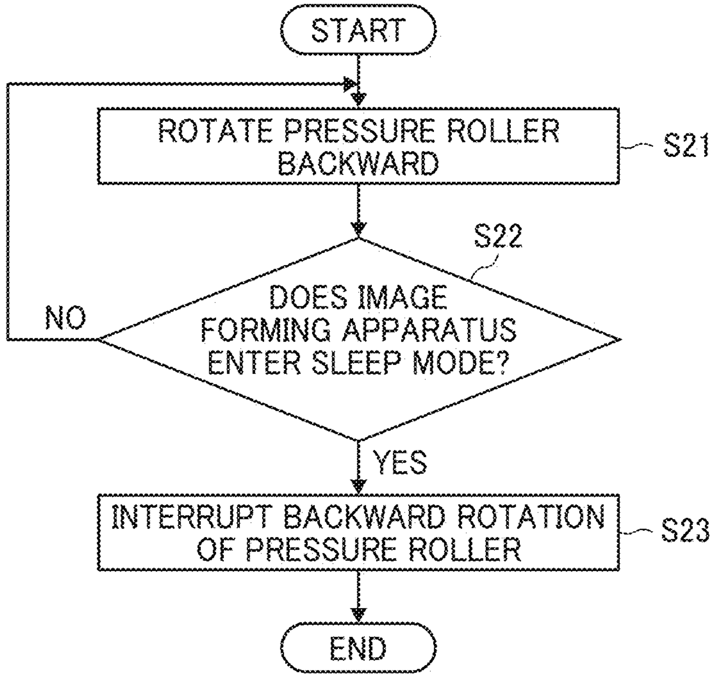
FIG. 10B is a flowchart illustrating control processes performed by the controller depicted in FIG. 8B to control rotation of a pressure roller incorporated in the fixing device depicted in FIG. 8B.

Referring to FIGS. 10A and 10B illustrating flowcharts, a description is provided of control processes for controlling driving of the pressure roller 21.

The control processes depicted in the flowcharts in FIGS. 10A and 10B are performed by the controller 220 that is described above with reference to FIG. 5 and installed in the fixing device 9 or 9A or a controller that is installed in the image forming apparatus 100 depicted in FIG. 1.

As described above with reference to FIGS. 9A and 9B, after the controller 220 controls the driver 40 to interrupt rotation of the pressure roller 21, the controller 220 controls the driver 40 to drive and rotate the pressure roller 21 backward for the predetermined time. Accordingly, when the controller 220 controls the driver 40 to restart the pressure roller 21 so that the pressure roller 21 drives and rotates the fixing film 20, the pressure roller 21 prevents the fixing film 20 from bulging at the downstream position disposed downstream from the fixing nip N in the sheet conveyance direction FP.

In order to increase productivity of the image forming apparatus 100, the driver 40 is requested to drive and rotate the pressure roller 21 backward in a minimum amount. According to an experiment, when the pressure roller 21 has an increased temperature when printing (e.g., a print job) is finished, the pressure roller 21 and the fixing film 20 store an increased amount of heat at the fixing nip N. If the pressure roller 21 and the fixing film 20 are cooled naturally in a state in which the pressure roller 21 and the fixing film 20 store the increased amount of heat at the fixing nip N, the fixing film 20 is more subject to deformation. Hence, when a next print job starts, the fixing film 20 suffers from increase in irregular change in the orbit (e.g., flapping). When a print job is finished, the image forming apparatus 100 incorporating the nip forming unit or the nip forming device finishes printing (e.g., image formation) on one or more sheets P specified by a user using the control panel.

Conversely, when the pressure roller 21 has a decreased temperature when printing (e.g., a print job) is finished, the pressure roller 21 and the fixing film 20 store a decreased amount of heat at the fixing nip N. Even if the pressure roller 21 and the fixing film 20 are cooled naturally in a state in which the pressure roller 21 and the fixing film 20 store the decreased amount of heat at the fixing nip N, a temperature of the fixing film 20 at the fixing nip N is barely different from a temperature of the fixing film 20 at a position other than the fixing nip N. Accordingly, the fixing film 20 is less subject to deformation.

According to the embodiment, in view of the circumstances described above, the controller 220 controls the driver 40 to drive and rotate the pressure roller 21 as illustrated in the flowchart in FIG. 10A. For example, in step S11, the controller 220 receives a print job. In step S12, the controller 220 starts supplying power to the heater 22. In step S13, the controller 220 starts the print job (e.g., printing). In step S14, the controller 220 determines that the print job is finished. Immediately after step S14, in step S15, the thermistor 28 disposed opposite the pressure roller 21 detects a temperature $T_1$ of the pressure roller 21 indirectly.

In step S16, the controller 220 determines whether or not the temperature $T_1$ of the pressure roller 21 is higher than a predetermined temperature. For example, the controller 220 determines that the pressure roller 21 has an increased temperature if the temperature $T_1$ of the pressure roller 21 is higher than the predetermined temperature of 60 degrees Celsius. The controller 220 determines that the pressure roller 21 has a decreased temperature if the temperature $T_1$ of the pressure roller 21 is the predetermined temperature of 60 degrees Celsius or lower.

If the controller 220 determines that the temperature $T_1$ of the pressure roller 21 is 60 degrees Celsius or lower ($T_1 \leq 60°$ C.) (YES in step S16), in step S17, the controller 220 determines whether a number of sheets P that are printed is three or smaller when the print job is finished in step S14. If the controller 220 determines that the number of sheets P that are printed is three or lower ($N_P \leq 3$) (YES in step S17), the controller 220 controls the driver 40 to finish driving of the pressure roller 21 without backward rotation of the pressure roller 21.

If the controller 220 determines that the temperature $T_1$ of the pressure roller 21 is higher than 60 degrees Celsius (60° C.<$T_1$) (NO in step S16), the controller 220 controls the driver 40 to rotate the pressure roller 21 backward for 60 seconds in step S18. Thereafter, the controller 220 controls the driver 40 to interrupt backward rotation of the pressure roller 21. The controller 220 controls the driver 40 to rotate the pressure roller 21 backward in the backward direction B21 as illustrated in FIG. 9A or 9B. If the controller 220 determines that the number of sheets P that are printed is greater than three, that is, four or greater (NO in step S17), the controller 220 also controls the driver 40 to rotate the pressure roller 21 backward.

For example, in step S19, the controller 220 determines whether the number of sheets P that are printed is ten or smaller. If the controller 220 determines that the number of sheets P that are printed is ten or smaller ($N_P \leq 10$) (YES in step S19), the controller 220 controls the driver 40 to rotate the pressure roller 21 backward for 30 seconds in step S20. Thereafter, the controller 220 controls the driver 40 to interrupt backward rotation of the pressure roller 21. The controller 220 controls the driver 40 to rotate the pressure roller 21 backward in the backward direction B21 as illustrated in FIG. 9A or 9B, like in step S18 described above.

If the controller 220 determines that the number of sheets P that are printed is greater than ten, that is, eleven or greater (NO in step S19), the controller 220 controls the driver 40 to rotate the pressure roller 21 backward for 60 seconds in step S18. Thereafter, the controller 220 controls the driver 40 to interrupt backward rotation of the pressure roller 21. The controller 220 controls the driver 40 to rotate the pressure roller 21 backward in the backward direction B21 as illustrated in FIG. 9A or 9B, like in step S18 described above.

After the controller 220 controls the driver 40 to rotate the pressure roller 21 backward as described above, the fixing film 20 stops at a stop position that is shifted from a former stop position step by step as illustrated in FIG. 8A. Accordingly, as illustrated in the right part in FIG. 8A, deformation (e.g., flat spots) of the fixing film 20 is divided into the plurality of parts in the circumferential direction of the fixing film 20. Additionally, the fixing devices 9 and 9A also suppress compression set of the pressure roller 21.

The controller 220 adjusts conditions described above (e.g., the predetermined temperature used to determine whether or not the temperature $T_1$ is high or low, the time for which the driver 40 drives and rotates the pressure roller 21 backward, and the number of sheets P that are printed) according to a status of the image forming apparatus 100. If the image forming apparatus 100 enters a sleep mode after the image forming apparatus 100 does not operate for a predetermined time, when the image forming apparatus 100 enters the sleep mode, the controller 220 may cancel control of backward rotation of the pressure roller 21 while the pressure roller 21 rotates backward.

For example, as illustrated in FIG. 10B, in step S21, the controller 220 controls the driver 40 to drive and rotate the pressure roller 21 backward. In step S22, the controller 220 determines whether or not the image forming apparatus 100 enters the sleep mode. If the controller 220 determines that the image forming apparatus 100 enters the sleep mode (YES in step S22), the controller 220 controls the driver 40 to interrupt backward rotation of the pressure roller 21 in step S23.

A description is provided of a graphene sheet.

The thermal conductor is made of the graphene sheet. Hence, the thermal conductor has an enhanced thermal conductivity in a predetermined direction along a surface of the graphene sheet, that is, an arrangement direction in which the resistive heat generators 31 are arranged, not a thickness direction of the heater 22. Accordingly, the thermal conductor suppresses uneven temperature of the heater 22 and the fixing film 20 in the arrangement direction of the resistive heat generators 31 effectively.

Figure 11:
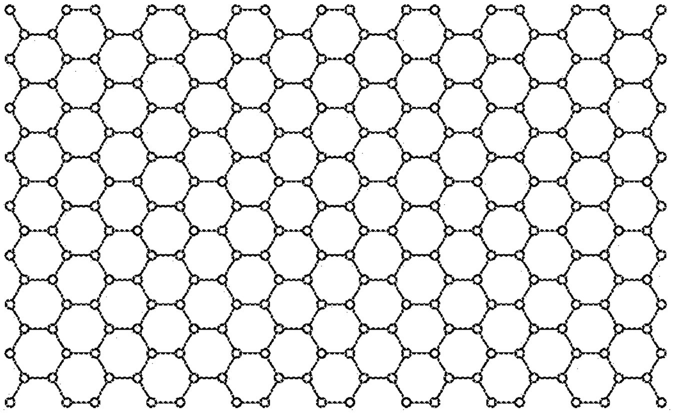
FIG. 11 is a diagram of a crystalline structure of atoms of graphene.

Graphene is thin powder. As illustrated in FIG. 11, graphene is constructed of a plane of carbon atoms arranged in a two-dimensional honeycomb lattice. The graphene sheet is graphene in a sheet form and is usually constructed of a single layer. The graphene sheet may contain impurities in the single layer of carbon atoms.

The graphene sheet may have a fullerene structure. The fullerene structure is generally recognized as a polycyclic compound constructed of an identical number of carbon atoms bonded to form a cage with fused rings of five and six atoms. For example, the fullerene structure is a closed cage structure formed of fullerene C60, C70, and C80, 3-coordinated carbon atoms, or the like.

The graphene sheet is artificial and is produced by chemical vapor deposition (CVD), for example. The graphene sheet is commercially available. A size and a thickness of the graphene sheet and a number of layers and the like of a graphite sheet described below are measured with a transmission electron microscope (TEM), for example.

Figure 12:
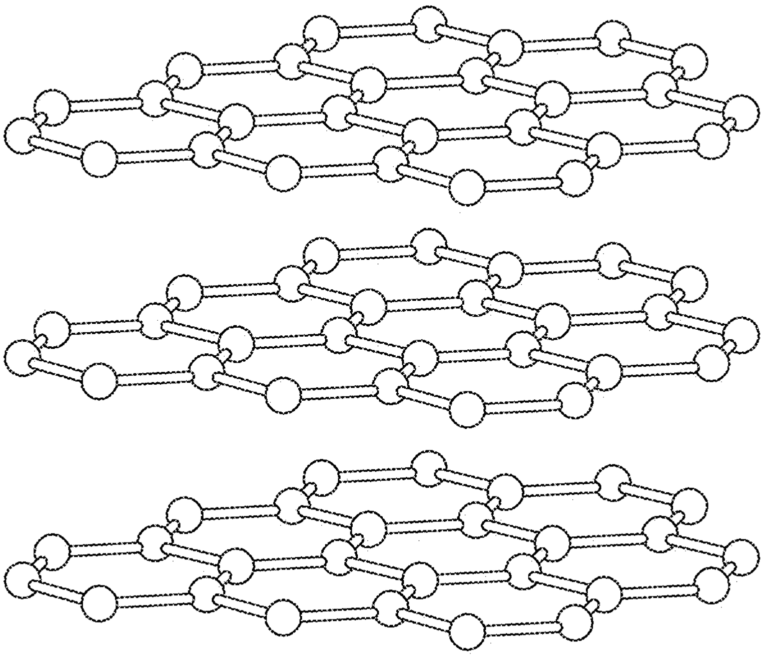
FIG. 12 is a diagram of a crystalline structure of atoms of graphite.

Graphite is constructed of stacked layers of graphene and is highly anisotropic in thermal conduction. As illustrated in FIG. 12, graphite has a plurality of layers, each of which is constructed of hexagonal fused rings of carbon atoms, that are bonded planarly. The plurality of layers defines a crystalline structure.

In the crystalline structure, adjacent carbon atoms in the layer are bonded with each other by a covalent bond. Bonding between the layers of carbon atoms is established by the van der Waals bond. The covalent bond achieves bonding greater than bonding of the van der Waals bond. Graphite is highly anisotropic with bonding within the layer and bonding between the layers.

For example, the thermal conductor is made of graphite. Accordingly, the thermal conductor attains an efficiency in conduction of heat in the arrangement direction in which the resistive heat generators 31 are arranged, that is, a longitudinal direction of the thermal conductor, which is greater than an efficiency in conduction of heat in a thickness direction, that is, a laminating direction in which the heater holder 23 and the heater 22 are arranged, thus suppressing conduction of heat to the heater holder 23. Consequently, the thermal conductor suppresses uneven temperature of the heater 22 in the arrangement direction in which the resistive heat generators 31 are arranged, that is, the longitudinal direction of the heater 22, efficiently. Additionally, the thermal conductor minimizes heat conducted to the heater holder 23. The thermal conductor made of graphite attains enhanced heat resistance that inhibits oxidation at approximately 700 degrees Celsius.

The graphite sheet has a physical property and a dimension that are adjusted properly according to a function of the thermal conductor. For example, the graphite sheet is made of graphite having enhanced purity or single crystal graphite. The graphite sheet has an increased thickness to enhance anisotropic thermal conduction.

In order to perform high speed fixing, each of the fixing devices 9 and 9A employs the graphite sheet having a decreased thickness to decrease thermal capacity of each of the fixing devices 9 and 9A. If the fixing nip N and the heater 22 have an increased length in the longitudinal direction thereof, the thermal conductor may also have an increased length in the arrangement direction in which the resistive heat generators 31 are arranged, that is, the longitudinal direction of the thermal conductor.

In view of increasing mechanical strength, the graphite sheet preferably has a number of layers that is not smaller than 11 layers. The graphite sheet may include a part constructed of a single layer and another part constructed of a plurality of layers.

The above describes the embodiments of the present disclosure applied to a fixing device (e.g., the fixing devices 9 and 9A) as one example of a film type heating device including a rotator driver. However, application of the embodiments of the present disclosure is not limited to the fixing device. Alternatively, the embodiments of the present disclosure may be applied to a heating device such as a dryer that dries liquid such as ink applied on a sheet, a laminator that bonds film as a coating member onto a surface of a sheet by thermocompression, and a heat sealer that bonds sealing portions of a packaging material by thermocompression.

Referring to FIGS. 13 to 23, a description is provided of constructions of fixing devices according to modification embodiments of the fixing devices 9 and 9A depicted in FIGS. 2 and 9A, respectively.

FIGS. 13 to 23 omit illustration of the separator 310 described above with reference to FIGS. 9A, 9B, and 9C. For example, the separator 310 is disposed downstream from the fixing nip N or a fixing nip N2 in the sheet conveyance direction FP depicted in FIGS. 13 to 16 in which the sheet P is conveyed, like the separator 310 depicted in FIGS. 9A, 9B, and 9C.

Figure 13:
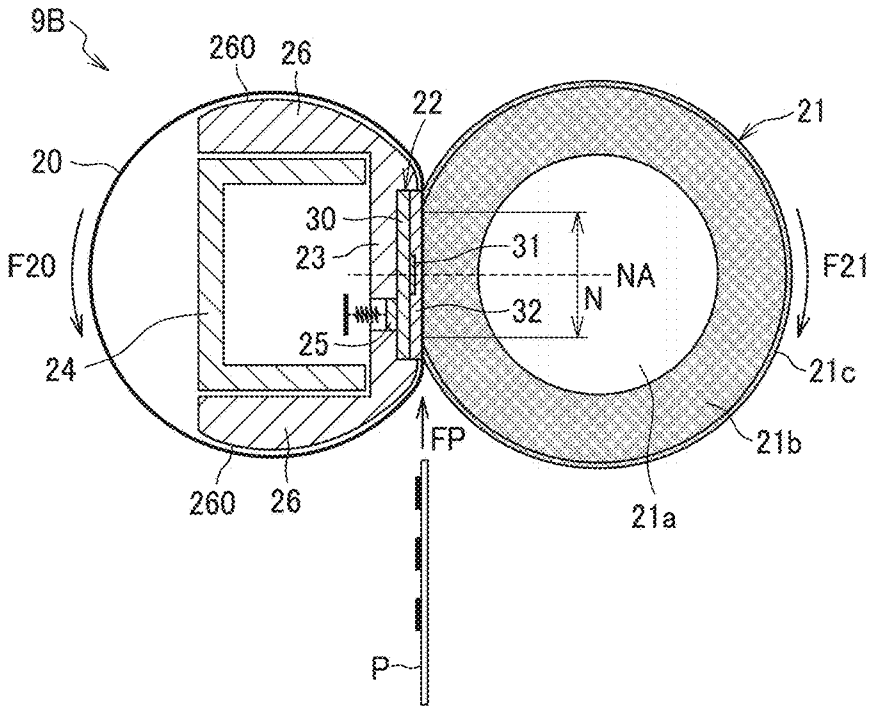
FIG. 13 is a schematic cross-sectional view of a fixing device according to yet another embodiment of the present disclosure that is installable in the image forming apparatus depicted in FIG. 1, illustrating an arrangement of thermistors incorporated in the fixing device.

Referring to FIG. 13, a description is provided of a construction of a fixing device 9B according to an embodiment of the present disclosure.

The fixing device 9B incorporates the thermistors 25 that are disposed at positions different from positions of the thermistors 25 depicted in FIG. 2. According to the embodiment, the thermistors 25 are disposed upstream from a center NA of the fixing nip N in the forward direction F20 of the fixing film 20, that is, an orthogonal direction perpendicular to the arrangement direction in which the resistive heat generators 31 are arranged. In other words, the thermistors 25 are disposed in proximity to an entry to the fixing nip N. Since a sheet P draws heat from the fixing film 20 at the entry to the fixing nip N easily, the thermistors 25 detect a temperature of the heater 22 at the entry to the fixing nip N, thus achieving a fixing property of fixing a toner image on a sheet P properly and suppressing fixing offset effectively.

Figure 14:
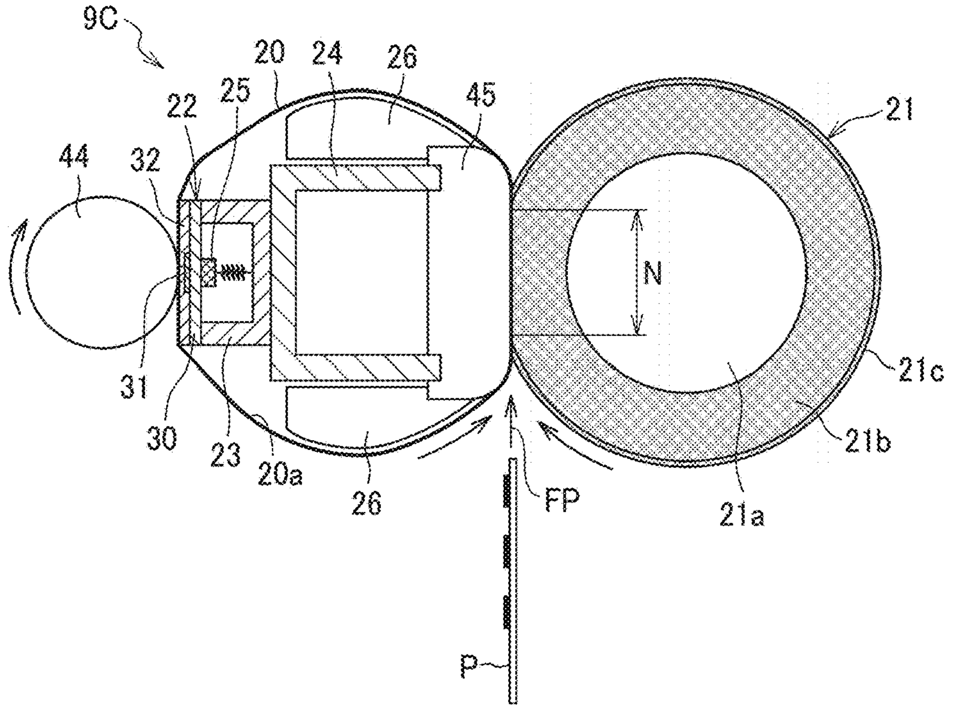
FIG. 14 is a schematic cross-sectional view of a fixing device according to yet another embodiment of the present disclosure that is installable in the image forming apparatus depicted in FIG. 1.

Referring to FIG. 14, a description is provided of a construction of a fixing device 9C according to an embodiment of the present disclosure.

The fixing device 9C includes a pressing roller 44 that is disposed opposite the pressure roller 21 via the fixing film 20. The pressing roller 44 serves as an opposed rotator disposed opposite the fixing film 20 serving as a rotator. The pressing roller 44 rotates in accordance with rotation of the fixing film 20. The pressing roller 44 and the heater 22 sandwich the fixing film 20 so that the heater 22 heats the fixing film 20.

Within the loop formed by the fixing film 20 is a nip formation pad 45 that is disposed opposite the pressure roller 21 via the fixing film 20. The nip formation pad 45 is in contact with or disposed opposite the inner circumferential face 20*a* of the fixing film 20. The stay 24 supports the nip formation pad 45. The nip formation pad 45 and the pressure roller 21 sandwich the fixing film 20 and define the fixing nip N.

Figure 15:
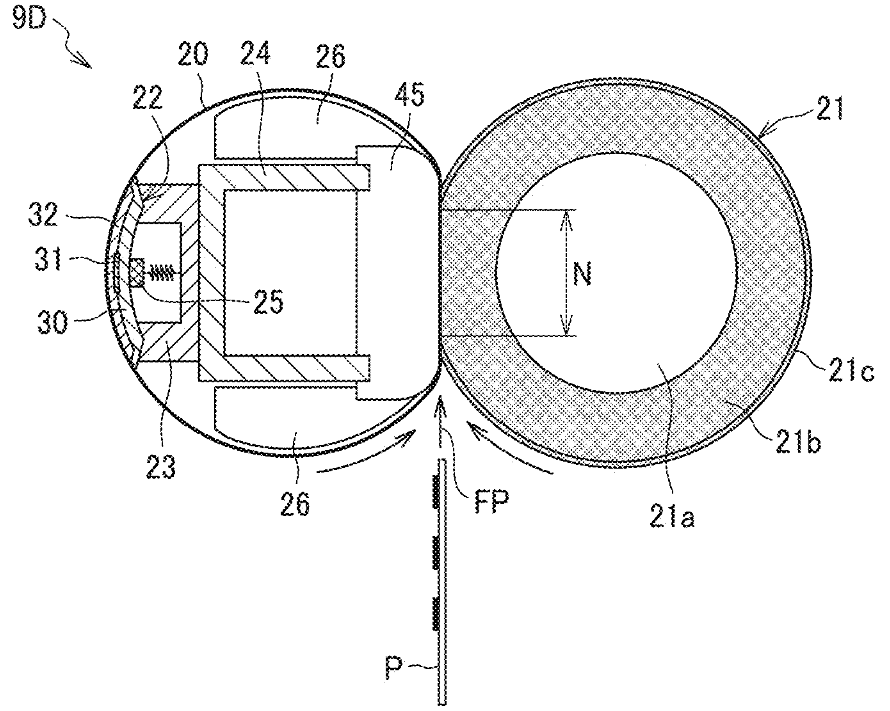
FIG. 15 is a schematic cross-sectional view of a fixing device according to yet another embodiment of the present disclosure that is installable in the image forming apparatus depicted in FIG. 1.

Referring to FIG. 15, a description is provided of a construction of a fixing device 9D according to an embodiment of the present disclosure.

The fixing device 9D does not include the pressing roller 44. In order to attain a contact length for which the heater 22 contacts the fixing film 20 in the circumferential direction thereof, the heater 22 is curved into an arc in cross section that corresponds to a curvature of the fixing film 20. Other construction of the fixing device 9D is equivalent to the construction of the fixing device 9C depicted in FIG. 14.

Figure 16:
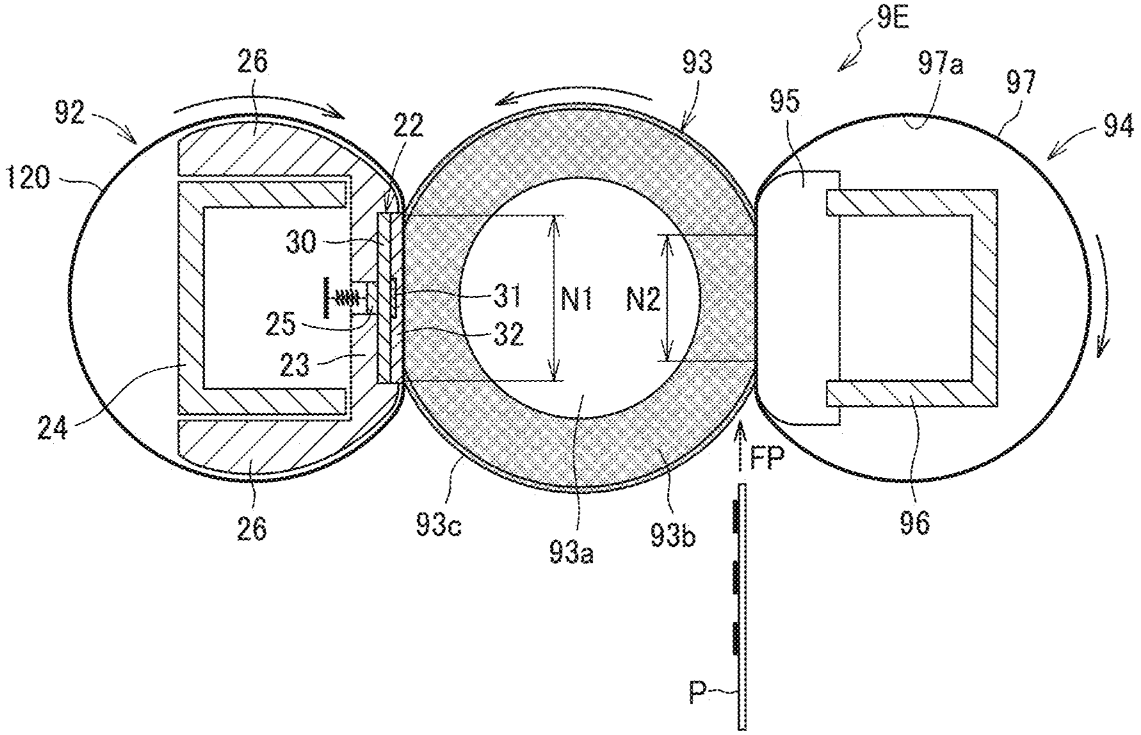
FIG. 16 is a schematic cross-sectional view of a fixing device according to yet another embodiment of the present disclosure that is installable in the image forming apparatus depicted in FIG. 1.

Referring to FIG. 16, a description is provided of a construction of a fixing device 9E according to an embodiment of the present disclosure.

The fixing device 9E includes a heating assembly 92, a fixing roller 93 serving as a pressure rotator, and a pressure assembly 94 serving as an opposed rotator.

The heating assembly 92 includes the heater 22, the heater holder 23, and the stay 24 that are described in the embodiments above and a heating belt 120 serving as a rotator. The fixing roller 93 serves as an opposed rotator that is disposed opposite the heating belt 120 serving as the rotator and rotates. The fixing roller 93 includes a core metal 93*a* that is solid and made of iron, an elastic layer 93*b* that is disposed on a surface of the core metal 93*a*, and a release layer 93*c* that coats an outer surface of the elastic layer 93*b*.

The pressure assembly 94 is disposed opposite the heating assembly 92 via the fixing roller 93. The pressure assembly 94 includes a nip formation pad 95, a stay 96, and a pressure belt 97. The pressure belt 97 rotates and is formed into a loop within which the nip formation pad 95 and the stay 96 are disposed. The nip formation pad 95 is in contact with or disposed opposite an inner circumferential face 97*a* of the pressure belt 97 serving as an endless film. The heating belt 120 and the fixing roller 93 define a heating nip N1 therebetween. The pressure belt 97 and the fixing roller 93 define the fixing nip N2 therebetween. As a sheet P is conveyed through the fixing nip N2, the fixing roller 93 heated at the heating nip N1 and the pressure belt 97 fix a toner image formed on the sheet P thereon under heat and pressure.

Figure 19:
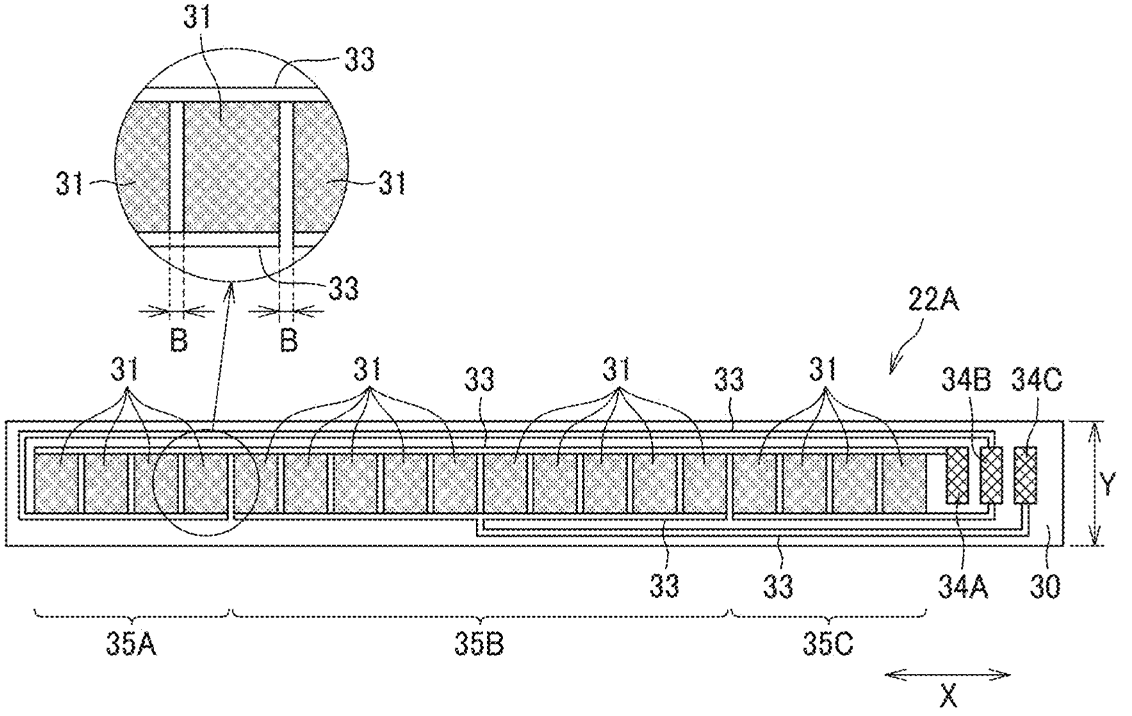
FIG. 19 is a plan view of a heater incorporated in the fixing device depicted in FIG. 18.

Also in the fixing devices 9B, 9C, 9D, and 9E depicted in FIGS. 13 to 16, respectively, the heater 22 is subject to a decreased heat generation amount at a gap B illustrated in FIG. 19 between the adjacent resistive heat generators 31. To address the circumstance, like in the embodiments described above, each of the fixing devices 9B, 9C, 9D, and 9E includes a temperature detector including a temperature detecting element that is disposed opposite the gap B between the adjacent resistive heat generators 31 of the heater 22. Accordingly, the heater 22 heats an opposed portion of the rotator (e.g., the fixing film 20 and the heating belt 120), which is disposed opposite the gap B, sufficiently. Consequently, the heater 22 attains the fixing property of fixing the toner image on the sheet P properly and prevents failures such as fixing offset.

Application of the technology of the present disclosure is not limited to the fixing devices (e.g., the fixing devices 9, 9A, 9B, 9C, 9D, and 9E) according to the embodiments described above. For example, the technology of the present disclosure is also applied to a heating device such as a dryer that dries ink applied onto a sheet. Further, the technology of the present disclosure is also applied to a heating device such as a thermocompression bonding device including a laminator and a heat sealer. The laminator bonds film as a coating member onto a surface of a sheet by thermocompression. The heat sealer bonds sealing portions of a packaging material by thermocompression. Accordingly, the heating device heats the opposed portion of the rotator, which is disposed opposite the gap B, sufficiently.

Application of the technology of the present disclosure is not limited to the color image forming apparatus 100 depicted in FIG. 1 that forms a color toner image. The technology of the present disclosure is also applied to a monochrome image forming apparatus that forms a monochrome toner image, a copier, a printer, a facsimile machine, a multifunction peripheral (MFP) having at least two of copying, printing, facsimile, scanning, and plotter functions, or the like.

Figure 17:
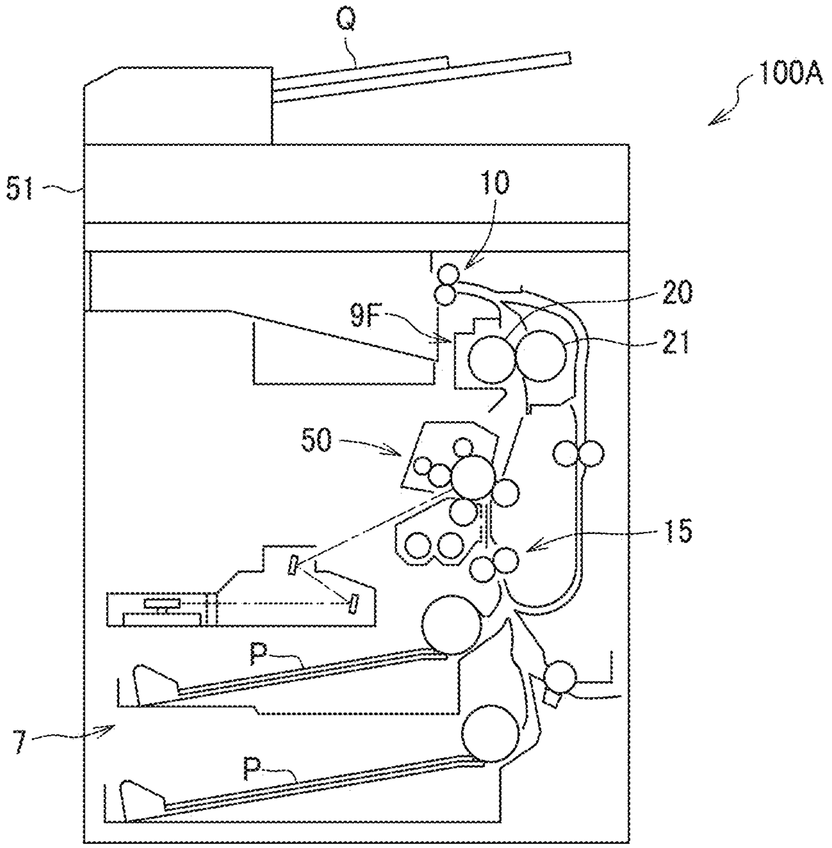
FIG. 17 is a schematic cross-sectional view of an image forming apparatus according to another embodiment of the present disclosure that is different from the image forming apparatus depicted in FIG. 1.

For example, FIG. 17 illustrates an image forming apparatus 100A applied with the technology of the present disclosure. The image forming apparatus 100A includes an image forming device 50 including a photoconductive drum, a sheet conveyance device including the timing roller pair 15, the sheet feeder 7, a fixing device 9F, the output device 10, and a scanner 51. The sheet feeder 7 includes a plurality of sheet trays (e.g., paper trays) that loads a plurality of sheets P having different sizes, respectively.

The scanner 51 reads an image on an original Q into image data. The sheet feeder 7 loads the plurality of sheets P and feeds the sheets P to a conveyance path one by one. The timing roller pair 15 conveys the sheet P conveyed through the conveyance path to the image forming device 50.

The image forming device 50 forms a toner image on the sheet P. For example, the image forming device 50 includes the photoconductive drum, a charging roller, an exposure device, a developing device, a replenishing device, a transfer roller, a cleaner, and a discharger. The toner image is a reproduction of the image on the original Q, for example.

The fixing device 9F fixes the toner image on the sheet P under heat and pressure. The sheet P bearing the fixed toner image is conveyed to the output device 10 by a conveyance roller and the like. The output device 10 ejects the sheet P onto an outside of the image forming apparatus 100A.

A description is provided of a construction of the fixing device 9F according to an embodiment of the present disclosure.

A description of a construction of the fixing device 9F, which is common to the fixing device 9 depicted in FIG. 2, is omitted properly.

Figure 18:
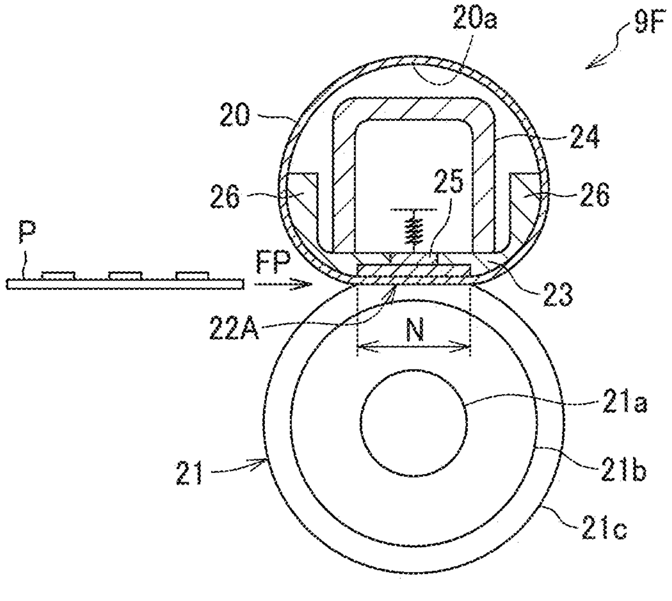
FIG. 18 is a schematic cross-sectional view of a fixing device according to yet another embodiment of the present disclosure that is incorporated in the image forming apparatus depicted in FIG. 17.

As illustrated in FIG. 18, the fixing device 9F includes the fixing film 20, the pressure roller 21, a heater 22A, the heater holder 23, the stay 24, and the thermistors 25. The fixing film 20 and the pressure roller 21 define the fixing nip N therebetween. The fixing nip N has a nip length of 10 mm in the sheet conveyance direction FP. The fixing film 20 and the pressure roller 21 convey the sheet P at a linear velocity of 240 mm/s.

The fixing film 20 includes the base layer made of polyimide and the release layer and does not include the elastic layer. The release layer is heat-resistant film made of fluororesin, for example. The fixing film 20 has an outer diameter of approximately 24 mm.

The pressure roller 21 includes the core metal 21*a*, the elastic layer 21*b*, and the release layer 21*c*. The pressure roller 21 has an outer diameter in a range of from 24 mm to 30 mm. The elastic layer 21*b* has a thickness in a range of from 3 mm to 4 mm.

The heater 22A includes a base layer, a thermal insulation layer, a conductor layer including resistive heat generators, and an insulating layer. The heater 22A has a total thickness of 1 mm. The heater 22A has a length of 13 mm in an orthogonal direction Y depicted in FIG. 19 perpendicular to an arrangement direction X in which the resistive heat generators 31 are arranged.

As illustrated in FIG. 19, the conductor layer of the heater 22A includes the plurality of resistive heat generators 31, the feeders 33, and electrodes 34A, 34B, and 35C. According to the embodiment also, the gap B is interposed between the adjacent resistive heat generators 31 in the arrangement direction X in which the resistive heat generators 31 are arranged. FIG. 19 illustrates the two gaps B in an enlarged view. However, the gap B is disposed at each gap between the adjacent resistive heat generators 31 depicted in FIG. 19.

The heater 22A further includes three heat generation portions 35A, 35B, and 35C each of which is constructed of the resistive heat generators 31. As the electrodes 34A and 34B are energized, the heat generation portions 35A and 35C generate heat. As the electrodes 34A and 34C are energized, the heat generation portion 35B generates heat. For example, in order to fix a toner image on a sheet P having a decreased size not greater than a predetermined size, the heat generation portion 35B generates heat. In order to fix a toner image on a sheet P having an increased size greater than the predetermined size, the heat generation portions 35A, 35B, and 35C generate heat.

Figure 20:
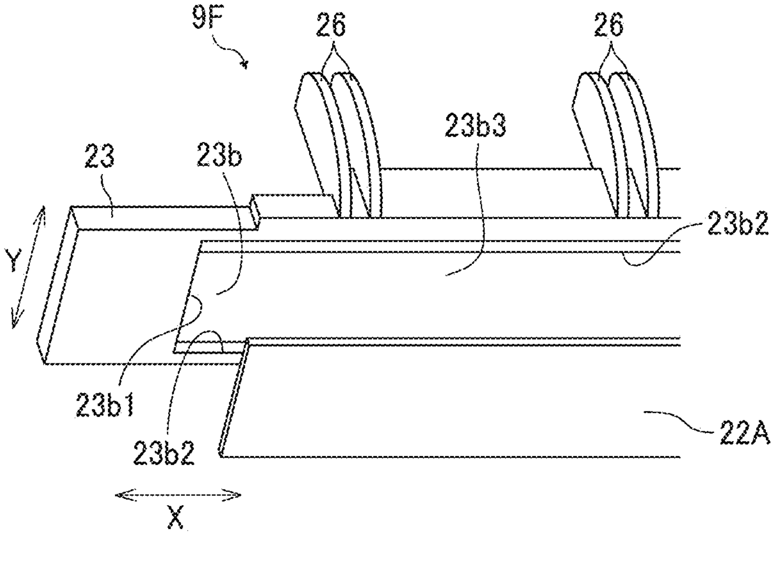
FIG. 20 is a perspective view of the heater depicted in FIG. 19 and the heater holder incorporated in the fixing device depicted in FIG. 18.

As illustrated in FIG. 20, the heater holder 23 includes a recess 23*b* that holds the heater 22A. The recess 23*b* is disposed on a heater opposed face of the heater holder 23, which is disposed opposite the heater 22A. The recess 23*b* includes a bottom face 23*b*3 and walls 23*b*1 and 23*b*2. The bottom face 23*b*3 is substantially parallel to the base 30 and recessed with respect to the heater 22A compared to other faces of the heater 22A. The wall 23*b*1 is disposed at at least one of both lateral ends of the heater holder 23 in the arrangement direction X and serves as an interior wall of the heater holder 23. The walls 23*b*2 are disposed at both ends of the heater holder 23 in the orthogonal direction Y perpendicular to the arrangement direction X and serve as interior walls of the heater holder 23, respectively.

The heater holder 23 mounts the guides 26. The heater holder 23 is made of LCP.

Figure 21:
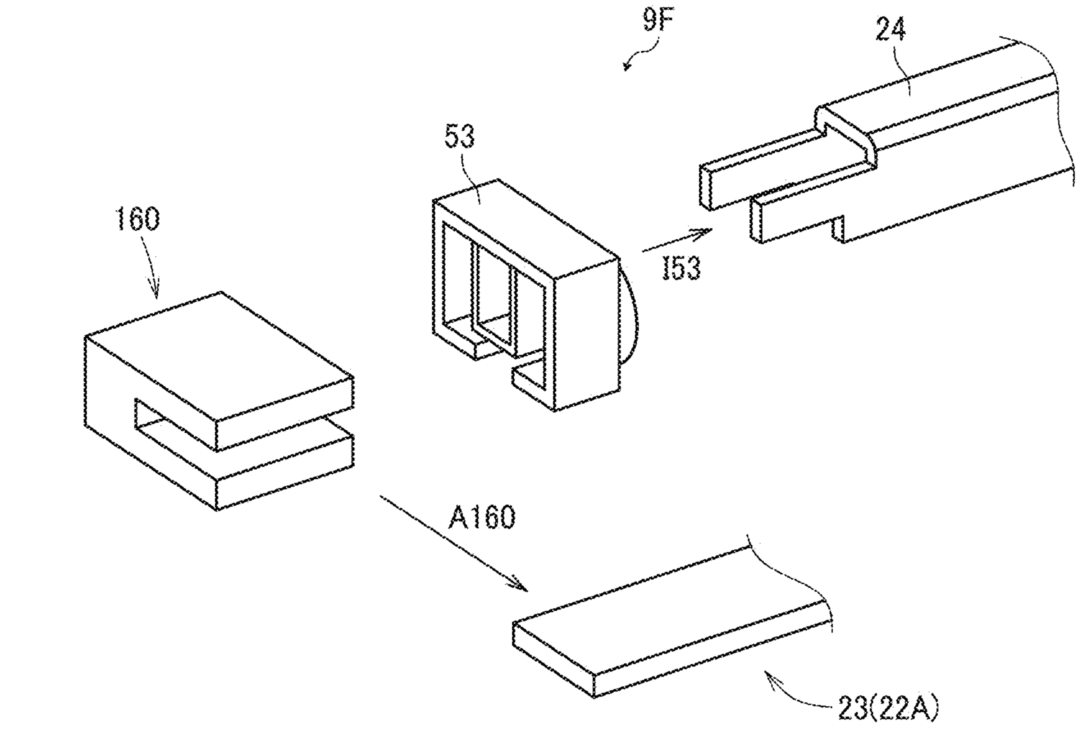
FIG. 21 is a perspective view of the heater depicted in FIG. 20 and a connector to be attached to the heater.

As illustrated in FIG. 21, the fixing device 9F further includes a connector 160 that includes a housing made of resin such as LCP and a plurality of contact terminals disposed in the housing. The connector 160 is attached to the heater 22A and the heater holder 23 such that the connector 160 sandwiches the heater 22A and the heater holder 23 together at a front face and a back face of the heater 22A and the heater holder 23.

In a state in which the connector 160 sandwiches and holds the heater 22A and the heater holder 23, as the contact terminals of the connector 160 contact and press against the electrodes 34A, 34B, and 34C of the heater 22A, the heat generation portions 35A, 35B, and are electrically connected to a power supply disposed in the image forming apparatus 100A through the connector 160. Thus, the power supply is ready to supply power to the heat generation portions 35A, 35B, and 35C. At least a part of each of the electrodes 34A, 34B, and 34C is not coated with the insulating layer and is exposed so that each of the electrodes 34A, 34B, and 34C is coupled to the connector 160.

The fixing device 9F further includes a flange 53 that is disposed at each lateral end of the fixing film 20 in the longitudinal direction thereof, that is, the arrangement direction X depicted in FIG. 20. The flange 53 contacts the inner circumferential face 20*a* of the fixing film 20 depicted in FIG. 18 and holds or supports the fixing film 20 at each lateral end of the fixing film 20 in the longitudinal direction thereof. The flanges 53 are secured to a frame of the fixing device 9F. The flange 53 is inserted into each lateral end of the stay 24 in the longitudinal direction thereof in an insertion direction 153 illustrated in FIG. 21.

The connector 160 is attached to the heater 22A and the heater holder 23 in an attachment direction A160 that is parallel to the orthogonal direction Y perpendicular to the arrangement direction X in which the resistive heat generators 31 are arranged. Alternatively, in order to attach the connector 160 to the heater holder 23, one of the connector 160 and the heater holder 23 may include a projection that engages a recess disposed in another one of the connector 160 and the heater holder 23 such that the projection moves inside the recess relatively. The connector 160 is attached to one lateral end of the heater 22A and the heater holder 23 in the arrangement direction X in which the resistive heat generators 31 are arranged. The one lateral end of the heater 22A and the heater holder 23 is opposite to another lateral end of the heater 22A and the heater holder 23 to which the driver 40 (e.g., the motor) that drives the pressure roller 21 is coupled.

Figure 22:
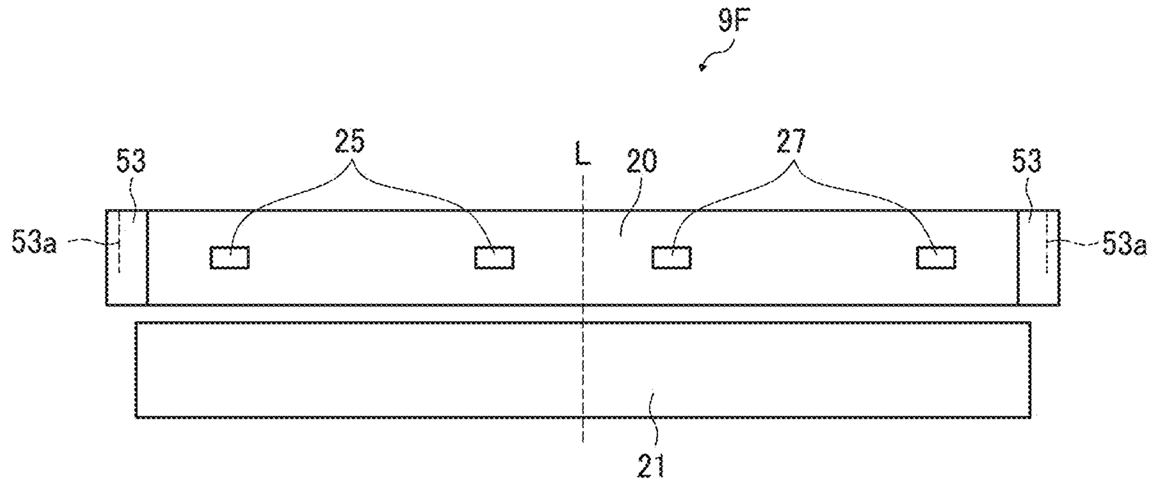
FIG. 22 is a diagram of the thermistors, thermostats, and flanges incorporated in the fixing device depicted in FIG. 18, illustrating an arrangement of the thermistors and the thermostats.

As illustrated in FIG. 22, the thermistors 25 are disposed opposite the inner circumferential face 20*a* of the fixing film 20 at a position in proximity to a center line L and a position in one lateral end of the fixing film 20 in the longitudinal direction thereof, that is, the arrangement direction X in which the resistive heat generators 31 are arranged, respectively. The controller 220 depicted in FIG. 5 controls the heater 22A based on a temperature of the fixing film 20, that is detected by the thermistor 25 disposed at the position in proximity to the center line L, and a temperature of the fixing film 20, that is detected by the thermistor 25 disposed opposite the one lateral end of the fixing film 20 in the longitudinal direction thereof. Like the thermistor 25 of the fixing device 9 according to the embodiment described above with reference to FIG. 2, one of the thermistors 25 depicted in FIG. 22 is disposed opposite the gap B between the adjacent resistive heat generators 31 of the heater 22A.

The fixing device 9F further includes the thermostats 27 that are disposed opposite the inner circumferential face 20*a* of the fixing film 20 at a position in proximity to the center line L and a position in another lateral end of the fixing film 20 in the longitudinal direction thereof, respectively. If the thermostat 27 detects a temperature of the fixing film 20, that is higher than a preset threshold, the thermostat 27 breaks power to the heater 22A.

The flanges 53 contact and support both lateral ends of the fixing film 20 in the longitudinal direction thereof, respectively. Each of the flanges 53 is made of LCP.

Figure 23:
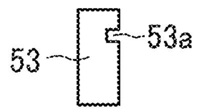
FIG. 23 is a diagram of the flange depicted in FIG. 22, illustrating a slide groove of the flange.

As illustrated in FIG. 23, the flange 53 includes a slide groove 53*a*. The slide groove 53*a* extends in a contact-separation direction in which the fixing film 20 comes into contact with and separates from the pressure roller 21. The slide groove 53*a* engages an engagement mounted on the frame of the fixing device 9F. As the engagement moves relatively inside the slide groove 53*a*, the fixing film 20 moves in the contact-separation direction with respect to the pressure roller 21.

Also in the fixing device 9F, the temperature detecting element of each of the thermistors 25 is disposed opposite the gap B between the adjacent resistive heat generators 31 of the heater 22A. Accordingly, the heater 22A heats the opposed portion of the fixing film 20, which is disposed opposite the gap B, sufficiently. Consequently, the heater 22A attains the fixing property of fixing the toner image on the sheet P properly and prevents failures such as fixing offset.

An image forming apparatus that forms a monochrome toner image with toner in a single color is less subject to hot offset compared to an image forming apparatus that forms a color toner image with toners in a plurality of colors. Hence, like in the embodiments of the present disclosure, even if the controller 220 controls the heater 22A based on a detection result provided by the temperature detecting element that is disposed opposite the gap B between the adjacent resistive heat generators 31, the image forming apparatus that uses the toner in the single color is less susceptible to hot offset advantageously.

The above describes the embodiments of the present disclosure. However, the technology of the present disclosure is not limited to the embodiments described above and is modified into variations. For example, instead of the heater 22 or 22A that heats the fixing film 20, a fixing device may include a halogen heater that is disposed opposite the fixing nip N via the stay 24. The fixing device may further include a support stay serving as a nip formation pad that does not incorporate a heater and has a decreased thermal capacity.

The separator 310 may move toward and away from the fixing film 20. The separator 310 pivots as described above in the embodiments. Alternatively, in a state in which the separator 310 retains parallelism with the heater holder 23, the separator 310 may move in parallel to the heater holder 23 in a contact-separation direction with respect to the fixing film 20. According to the embodiments described above, the fixing film 20 of the fixing device 9, 9A, 9B, 9C, 9D, 9E, or 9F is used as an endless film. Alternatively, the technology of the present disclosure may be applied to an endless film for usage other than fixing a toner image on a sheet P.

A description is provided of advantages of a nip forming device (e.g., the fixing devices 9, 9A, 9B, 9C, 9D, 9E, and 9F).

As illustrated in FIGS. 2, 5, and 8B, the nip forming device (e.g., a nip forming unit) includes an endless film (e.g., the fixing film 20 and the pressure belt 97), at least one of a heater (e.g., the heaters 22 and 22A) or a nip former (e.g., the nip formation pads 45 and 95), a pressure rotator (e.g., the pressure roller 21 and the fixing roller 93), a detector (e.g., the thermistor 28), a driver (e.g., the driver 40), and a controller (e.g., the controller 220).

The endless film is flexible and rotates. The heater heats the endless film. The heater or the nip former (e.g., a nip formation pad) is in contact with or disposed opposite an inner circumferential face (e.g., the inner circumferential faces 20*a* and 97*a*) of the endless film. The pressure rotator presses against the heater or the nip former via the endless film to form a nip (e.g., the fixing nips N and N2) between the endless film and the pressure rotator. As the pressure rotator rotates, the pressure rotator drives and rotates the endless film. The detector detects a temperature of the pressure rotator. The controller controls the driver to drive and rotate the pressure rotator based on the temperature of the pressure rotator detected by the detector. A conveyed object (e.g., the sheet P) is conveyed through the nip.

After the controller controls the driver to drive and rotate the pressure rotator in a forward direction (e.g., the forward direction F21) to convey the conveyed object in a conveyance direction (e.g., the sheet conveyance direction FP), the controller controls the driver to interrupt rotation of the pressure rotator. If the controller determines that the temperature of the pressure rotator is higher than a predetermined temperature when a job of the nip forming device is finished, the controller controls the driver to interrupt rotation of the pressure rotator after the controller controls the driver to drive and rotate the pressure rotator for a predetermined time in a backward direction (e.g., the backward direction B21) opposite to the forward direction.

Accordingly, the nip forming device suppresses deformation of the endless film.

According to the embodiments described above, the fixing film 20 serves as an endless film. Alternatively, a fixing belt, a fixing sleeve, or the like may be used as an endless film.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A nip forming device comprising:

an endless film that is flexible, the endless film configured to rotate;

a heater configured to heat the endless film;

a pressure rotator configured to press against the heater via the endless film to form a nip between the endless film and the pressure rotator, the nip through which a conveyed object is conveyed;

a driver configured to drive and rotate the pressure rotator to cause the pressure rotator to drive and rotate the endless film;

a detector configured to detect a temperature of the pressure rotator; and a controller configured to control the driver to drive and rotate the pressure rotator based on the temperature of the pressure rotator, the controller configured to:

control the driver to drive and rotate the pressure rotator in a forward direction to convey the conveyed object in a conveyance direction and to interrupt forward rotation of the pressure rotator; and in response to a determination that the temperature of the pressure rotator is higher than a predetermined temperature when a job of the nip forming device is finished, control the driver to drive and rotate the pressure rotator for a predetermined time in a backward direction opposite to the forward direction and to interrupt backward rotation of the pressure rotator.

2. The nip forming device according to claim 1, wherein the controller is configured to control the driver to drive and rotate the pressure rotator in the backward direction continuously.

3. The nip forming device according to claim 1, wherein the controller is configured to control the driver to drive and rotate the pressure rotator in the backward direction intermittently.

4. The nip forming device according to claim 3, wherein the pressure rotator is configured to drive and rotate the endless film intermittently by 80 degrees for one driving.

5. The nip forming device according to claim 1, wherein the controller is configured to control the driver to drive and rotate the pressure rotator in the backward direction so as to cause the pressure rotator to rotate the endless film to a first stop position, and wherein the controller is configured to control the driver to drive and rotate the pressure rotator in the backward direction so as to cause the pressure rotator to further rotate the endless film to a second stop position that is different from the first stop position.

6. The nip forming device according to claim 1, wherein the controller is configured to control the driver to drive and rotate the pressure rotator in the backward direction at a rotation speed that is lower than a rotation speed at which the pressure rotator rotates in the forward direction to convey the conveyed object.

7. The nip forming device according to claim 1, wherein the controller is configured to control the driver to drive and rotate the pressure rotator in the backward direction after the pressure rotator conveys a predetermined number or more of conveyed objects.

8. The nip forming device according to claim 1, wherein the controller is configured to:

start a sleep mode when a predetermined time elapses after the pressure rotator interrupts conveyance of the conveyed object in the conveyance direction; and control the driver to interrupt the backward rotation of the pressure rotator when the sleep mode starts.

9. The nip forming device according to claim 1, further comprising a separator disposed downstream from the nip in the conveyance direction of the conveyed object, the separator configured to separate the conveyed object from the endless film.

10. The nip forming device according to claim 1, wherein the detector includes a thermistor disposed opposite the pressure rotator.

11. The nip forming device according to claim 1, wherein the pressure rotator includes a roller.

12. A nip forming device comprising:

an endless film that is flexible, the endless film configured to rotate;

a heater configured to heat the endless film;

a nip former disposed opposite an inner circumferential face of the endless film;

a pressure rotator configured to press against the nip former via the endless film to form a nip between the endless film and the pressure rotator, the nip through which a conveyed object is conveyed;

a driver configured to drive and rotate the pressure rotator to cause the pressure rotator to drive and rotate the endless film;

a detector configured to detect a temperature of the pressure rotator; and a controller configured to control the driver to drive and rotate the pressure rotator based on the temperature of the pressure rotator, the controller configured to:

control the driver to drive and rotate the pressure rotator in a forward direction to convey the conveyed object in a conveyance direction and to interrupt forward rotation of the pressure rotator; and in response to a determination that the temperature of the pressure rotator is higher than a predetermined temperature when a job of the nip forming device is finished, control the driver to drive and rotate the pressure rotator for a predetermined time in a backward direction opposite to the forward direction and to interrupt backward rotation of the pressure rotator.

13. The nip forming device according to claim 12, wherein the nip former includes a pad.

14. An image forming apparatus comprising:

an image forming device configured to form an image;

a nip forming device configured to fix the image on a conveyed object, the nip forming device including:

an endless film that is flexible, the endless film configured to rotate;

a heater configured to heat the endless film;

a pressure rotator configured to press against the heater via the endless film to form a nip between the endless film and the pressure rotator, the nip through which the conveyed object is conveyed; and a detector configured to detect a temperature of the pressure rotator;

a driver configured to drive and rotate the pressure rotator to cause the pressure rotator to drive and rotate the endless film; and a controller configured to control the driver to drive and rotate the pressure rotator based on the temperature of the pressure rotator, the controller configured to:

control the driver to drive and rotate the pressure rotator in a forward direction to convey the conveyed object in a conveyance direction and to interrupt forward rotation of the pressure rotator; and in response to a determination that the temperature of the pressure rotator is higher than a predetermined temperature when a job of the nip forming device is finished, control the driver to drive and rotate the pressure rotator for a predetermined time in a backward direction opposite to the forward direction and to interrupt backward rotation of the pressure rotator.

15. The image forming apparatus according to claim 14, wherein the controller is configured to control the driver to drive and rotate the pressure rotator in the backward direction continuously.

16. The image forming apparatus according to claim 14, wherein the controller is configured to control the driver to drive and rotate the pressure rotator in the backward direction intermittently.

17. The image forming apparatus according to claim 16, wherein the pressure rotator is configured to drive and rotate the endless film intermittently by 80 degrees for one driving.

18. The image forming apparatus according to claim 14, wherein the controller is configured to control the driver to drive and rotate the pressure rotator in the backward direction so as to cause the pressure rotator to rotate the endless film to a first stop position, and wherein the controller is configured to control the driver to drive and rotate the pressure rotator in the backward direction so as to cause the pressure rotator to further rotate the endless film to a second stop position that is different from the first stop position.

19. The image forming apparatus according to claim 14, wherein the controller is configured to control the driver to drive and rotate the pressure rotator in the backward direction at a rotation speed that is lower than a rotation speed at which the pressure rotator rotates in the forward direction to convey the conveyed object.

20. The image forming apparatus according to claim 14, wherein the controller is configured to control the driver to drive and rotate the pressure rotator in the backward direction after the pressure rotator conveys a predetermined number or more of conveyed objects.

* * * * *